United States Patent [19]
Van Lengerich et al.

[11] Patent Number: 5,435,714
[45] Date of Patent: * Jul. 25, 1995

[54] APPARATUS FOR THE PRODUCTION OF THREE-DIMENSIONAL FOOD PRODUCTS

[75] Inventors: Bernhard H. Van Lengerich, Ringwood; Denise Thorniley, Maywood, both of N.J.; John Palermo, Crestwood, N.Y.; Daniel A. Koppa, Bloomfield, N.J.

[73] Assignee: Nabisco, Inc., Parsippany, N.J.

[*] Notice: The portion of the term of this patent subsequent to Apr. 19, 2011 has been disclaimed.

[21] Appl. No.: 154,421

[22] Filed: Nov. 19, 1993

Related U.S. Application Data

[63] Continuation of Ser. No. 799,259, Nov. 27, 1991, Pat. No. 5,304,055.

[51] Int. Cl.⁶ ............ B29C 47/30; A21C 11/10; A21C 11/16
[52] U.S. Cl. ............ 425/313; 425/311; 425/404; 425/465; 426/503; 426/518; 99/367; 99/370; 83/932; 83/355
[58] Field of Search ............ 425/297, 307, 308, 302.1, 425/310, 301, 311, 306, 312, 313, 316, 227, 225, 232, 238, 603.1, 404, 465, 464; 426/503, 516, 517, 518, 523, 497; 83/862, 863, 698, 864, 318, 320, 303, 326, 321, 331, 341, 932, 355; 99/367, 370; 264/141, 142, 143

[56] References Cited

U.S. PATENT DOCUMENTS

| | | | |
|---|---|---|---|
| 855,379 | 5/1907 | Bangs . | |
| 1,720,097 | 7/1929 | Scholz | 425/363 |
| 1,724,563 | 8/1929 | Cooper | 426/516 |
| 1,747,954 | 2/1930 | Rydberg | 83/862 |
| 1,765,872 | 6/1930 | Laskey | 426/516 |
| 1,817,383 | 8/1931 | Laskey | 426/516 |
| 1,938,773 | 12/1933 | Ernest et al. | 29/105 |
| 2,113,717 | 4/1938 | Brown | 264/148 |
| 2,303,888 | 12/1942 | Miller | 264/148 |
| 2,361,369 | 10/1944 | Grebe et al. . | |
| 2,379,347 | 6/1945 | Fiedler | 29/49 |
| 2,401,236 | 5/1946 | Fielitz . | |
| 2,402,462 | 6/1946 | Sullivan . | |
| 2,437,460 | 3/1948 | Francisci | 425/312 |
| 2,488,129 | 11/1949 | La Lande, Jr. | 425/311 |

(List continued on next page.)

FOREIGN PATENT DOCUMENTS

621835 12/1962 Belgium .
0218992 4/1987 European Pat. Off. .

(List continued on next page.)

Primary Examiner—Khanh Nguyen

[57] ABSTRACT

Three-dimensional food products such as crackers, cookies, puffed snacks, puffable glassy half-products, pet foods, pasta, confections such as chewing gum, and ready-to-eat cereals are produced on a mass production basis by feeding a dough or other food composition to a plurality of dies which shape it into ropes. The shaped extrudate ropes obtained from each die are cut by a plurality of first blades which pass across only a portion of each of the orifices of the dies to partially cut each of the shaped extrudate ropes. A plurality of second blades pass across the entire orifice of each of the dies to completely cut each of the partially cut extrudate ropes into individual pieces. The use of a multi-port extrusion die permits higher mass flow rates and thus greater dough piece production rates at lower cutter speeds. The use of multi-port extrusion and lower cutter speeds increases shape, definition, and accuracy of cutting and reduces scattering and deformation of the individual pieces. The plurality of extrudate ropes are preferably cut simultaneously. The plurality of dies may be fed by a calendar press or preferably an extruder. In embodiments of the present invention, the blades may be arranged or mounted on a continuous band, a reciprocating or oscillating cutter which moves in a closed path, or a rotating shaft. The doughs which are cut into three-dimensional pieces may be raw, partially cooked or baked, or fully cooked or expanded. In the production of three-dimensional crackers, the amount of water and enzymes are used to increase the expandability or leavening ability of extruded cracker doughs.

15 Claims, 14 Drawing Sheets

U.S. PATENT DOCUMENTS

| | | | |
|---|---|---|---|
| 2,597,975 | 5/1952 | Colombo . | |
| 2,744,287 | 5/1956 | Parshall et al. . | |
| 2,764,952 | 10/1956 | Meakin | 425/313 |
| 2,793,598 | 5/1957 | Rivoche | 107/14 |
| 2,853,027 | 9/1958 | Graves | 107/14 |
| 2,963,995 | 12/1960 | Brudi | 107/14 |
| 3,025,564 | 3/1962 | Voight . | |
| 3,086,246 | 4/1963 | Stone . | |
| 3,089,194 | 5/1963 | Goins . | |
| 3,117,006 | 1/1964 | Wenger | 99/80 |
| 3,143,766 | 8/1964 | Rohn . | |
| 3,171,160 | 3/1965 | Moyer . | |
| 3,214,796 | 11/1965 | Ginavin . | |
| 3,225,717 | 12/1965 | Page | 83/864 |
| 3,226,527 | 12/1965 | Harding | 219/384 |
| 3,329,101 | 7/1967 | Urschel . | |
| 3,333,298 | 8/1967 | List et al. . | |
| 3,337,913 | 8/1967 | List | 425/313 |
| 3,341,892 | 9/1967 | Mayner . | |
| 3,349,333 | 10/1967 | Schippers et al. . | |
| 3,387,069 | 6/1968 | Stohr | 264/145 |
| 3,467,987 | 9/1969 | Foster . | |
| 3,476,567 | 11/1969 | Wood | 99/82 |
| 3,582,466 | 6/1971 | Quirk . | |
| 3,596,319 | 8/1971 | McKenica et al. . | |
| 3,605,649 | 9/1971 | Bundus . | |
| 3,624,830 | 11/1971 | Stehower et al. | 99/235 R |
| 3,646,894 | 3/1972 | Hasten et al. | 99/86 |
| 3,711,296 | 1/1973 | Lawarre, Sr. | 99/80 R |
| 3,777,600 | 12/1973 | Long et al. | 83/39 |
| 3,782,876 | 1/1974 | Groff . | |
| 3,784,533 | 1/1974 | Mach | 264/146 |
| 3,808,962 | 5/1974 | Liepa | 99/323.4 |
| 3,817,141 | 6/1974 | Simonetti | 83/651 |
| 3,823,301 | 7/1974 | Swarat | 219/121 L |
| 3,828,638 | 8/1974 | Bonney, Jr. | 83/356.1 |
| 3,861,844 | 1/1975 | Miller | 425/207 |
| 3,867,081 | 2/1975 | Everett | 425/295 |
| 3,867,082 | 2/1975 | Lambertus | 424/313 |
| 3,886,832 | 6/1975 | Harris . | |
| 3,912,434 | 10/1975 | Nagahara et al. | 425/142 |
| 3,915,615 | 10/1975 | Colgan . | |
| 3,976,799 | 8/1976 | Kelly, Jr. et al. | 426/311 |
| 3,998,919 | 12/1976 | Urquhart | 264/150 |
| 4,022,918 | 5/1977 | Miller . | |
| 4,097,212 | 6/1978 | Morishima et al. | 425/313 |
| 4,150,595 | 4/1979 | Loffler et al. | 83/171 |
| 4,152,102 | 5/1979 | Sasiela et al. | 425/288 |
| 4,179,255 | 12/1979 | Hale | 425/67 |
| 4,193,753 | 3/1980 | Yoshioka | 425/311 |
| 4,227,306 | 10/1980 | Meshulam . | |
| 4,240,779 | 12/1980 | Turk | 425/313 |
| 4,250,786 | 2/1981 | Bleich . | |
| 4,251,198 | 2/1981 | Altenburg | 425/67 |
| 4,254,607 | 3/1981 | Moore | 56/295 |
| 4,261,940 | 4/1981 | Bussey, Jr. | 264/53 |
| 4,262,476 | 4/1981 | Benenati | 56/295 |
| 4,300,877 | 11/1981 | Anderson | 425/67 |
| 4,327,050 | 4/1982 | Salmon | 264/142 |
| 4,332,538 | 6/1982 | Campbell | 425/140 |
| 4,336,010 | 6/1982 | Thompson | 425/141 |
| 4,368,610 | 1/1983 | Aono | 56/295 |
| 4,395,427 | 7/1983 | Fischer et al. . | |
| 4,401,421 | 8/1983 | Anders | 425/71 |
| 4,418,086 | 11/1983 | Marino et al. . | |
| 4,422,372 | 12/1983 | Hoezee | 99/353 |
| 4,423,078 | 12/1983 | Darley et al. . | |
| 4,440,704 | 4/1984 | Bussey, Jr. | 264/51 |
| 4,462,470 | 7/1984 | Alexander et al. | 175/72 |
| 4,478,565 | 10/1984 | Thompson | 425/141 |
| 4,488,464 | 12/1984 | Rooke et al. | 83/99 |
| 4,500,271 | 2/1985 | Smith | 425/67 |
| 4,514,165 | 4/1985 | Bussey, Jr. | 425/311 |
| 4,527,382 | 7/1985 | Aono | 56/295 |
| 4,534,724 | 8/1985 | Fischer et al. | 425/295 |
| 4,536,146 | 8/1985 | Hernandez et al. | 425/297 |
| 4,543,769 | 10/1985 | Schmitz . | |
| 4,574,673 | 3/1986 | Pearl . | |
| 4,581,970 | 4/1986 | Hanson | 83/871 |
| 4,597,979 | 7/1986 | Goglanian | 426/496 |
| 4,648,828 | 3/1987 | Abe et al. | 425/288 |
| 4,653,590 | 3/1987 | Shank | 172/15 |
| 4,698,228 | 10/1987 | Straka et al. . | |
| 4,756,916 | 7/1988 | Dreher et al. . | |
| 4,778,365 | 10/1988 | Archer . | |
| 4,802,838 | 2/1989 | Schaaf | 425/311 |
| 4,822,546 | 4/1989 | Lohkamp | 264/143 |

(List continued on next page.)

FOREIGN PATENT DOCUMENTS

| | | |
|---|---|---|
| 0218993 | 4/1987 | European Pat. Off. . |
| 0275878 | 7/1988 | European Pat. Off. . |
| 1502668 | 8/1969 | Germany . |
| 2050856 | 4/1972 | Germany . |
| 2301774 | 7/1974 | Germany . |
| 2616814 | 10/1977 | Germany . |
| 3131983 | 2/1983 | Germany . |
| 0518858 | 3/1955 | Italy . |

(List continued on next page.)

U.S. PATENT DOCUMENTS

| | | |
|---|---|---|
| 4,847,090 | 7/1989 | Della Posta et al. . |
| 4,850,845 | 7/1989 | Hicks . |
| 4,882,172 | 11/1989 | Van Alstine . |
| 4,886,441 | 12/1989 | Lortz ................................. 425/236 |
| 4,900,572 | 2/1990 | Repholz et al. .................... 426/282 |
| 4,966,542 | 10/1990 | Kobayashi ......................... 425/307 |
| 4,988,276 | 1/1991 | Moeller ............................. 425/290 |
| 4,999,206 | 3/1991 | Lortz ................................. 426/512 |
| 5,035,165 | 7/1991 | Madsen . |
| 5,071,668 | 12/1991 | Van Lengerich et al. . |
| 5,077,074 | 12/1991 | Van Lengerich . |
| 5,304,055 | 4/1994 | Van Lengerich et al. ......... 425/225 |

FOREIGN PATENT DOCUMENTS

| | | |
|---|---|---|
| 61-274673 | 12/1986 | Japan . |
| 61-280260 | 12/1986 | Japan . |
| 62-198373 | 9/1987 | Japan . |
| 110583 | 2/1961 | Pakistan . |
| 0008084 | of 1913 | United Kingdom . |
| 0026033 | of 1913 | United Kingdom . |
| 0266599 | 3/1927 | United Kingdom . |
| 0332041 | 7/1930 | United Kingdom . |
| 0824840 | 12/1937 | United Kingdom . |
| 2136666 | 9/1984 | United Kingdom . |
| 2172541 | 9/1986 | United Kingdom . |
| WO/8606327 | 11/1986 | WIPO . |

APPARATUS FOR THE PRODUCTION OF THREE-DIMENSIONAL FOOD PRODUCTS

This is a continuation of application Ser. No. 07/799,259, filed on Nov. 27, 1991, now U.S. Pat. No. 5,304,055.

FIELD OF THE INVENTION

The present invention relates to apparatus and methods for producing three-dimensional food products, such as crackers, snacks, expandable half-products, pasta, confections, ready-to-eat cereals and pet foods.

BACKGROUND OF THE INVENTION

The production of three-dimensional farinaceous-based food products using an extruder and rotating knives of different lengths is disclosed in U.S. Pat. No. 4,802,838 to Schaaf, Japanese Laid-Open Patent No. 61-274673 (published Dec. 4, 1986), and Japanese Laid-Open Patent No. 61-280260 published Dec. 10, 1986 both to Hoki and assigned to Ohyama Foods Machinery Co., Ltd. A short knife is used to partially cut or make grooves in the extrudate as it exits the extruder. A long knife fully cuts the partially cut extrudate into pieces. However, all of the knives cut the extrudate from only a single die orifice.

To increase production rates of the individual pieces, the extrusion rate through the single orifice must be increased together with an increase in speed of rotation of the long and short knives. However, as these rates increase, cutting accuracy tends to decrease, and the pieces tend to get thrown with greater force which can result in excessive deformation or damage to the pieces. Production rates may be increased by adding more single orifice extruders to the production line. However, the cost involved in using multiple extruders may be prohibitive.

U.S. Pat. No. 4,966,542 to Kobayashi discloses apparatus for the formation of a shaped food product wherein two pairs of cutters are used to reduce production loss caused by scattering of cut food by centrifugal force. Each cutter rotates about its own axis and revolves orbitally. According to the Kobayashi patent, even if the cutters make their serf rotation and orbital revolution at high speed, it does not cause scattering of food material, therefore making high speed production possible. However, the apparatus of U.S. Pat. No. 4,966,542 does not partially cut the extrudate to obtain three-dimensional shaped products.

U.S. Pat. No. 4,920,572 to Repholz et al discloses a multi-orifice coextrusion method and apparatus for preparing dual-textured pet food. The multi-orifice coextruding apparatus comprises a slicing means which functions to slice the center-filled stream as it is discharged from the die passages. A preferred slicing means is a rotating knife assembly which comprises about six to eight knives which are mounted on a hub which, in turn is mounted on a shaft disposed at about the center point of the die. According to Repholz et al the apparatus advantageously comprises a hood or cage-type element to prevent product which is sliced from the center-filled stream at high rates from being thrown in undesirable directions by the action of the rotating knife assembly. However, the Repholz et al patent does not disclose the production of partially cut extrudate pieces.

Multi-orifice extruders are also known in the pretzel extrusion art. However, like the Repholz et al apparatus and method, known pretzel extruders do not provide for partial cutting of the extrudate to obtain three-dimensional pieces.

The present invention provides a method and apparatus for the mass production of three dimensional food products, such as crackers, glassy half-products, puffed or fully expanded snacks, ready-to-eat cereals, confections, and pet foods in four-legged standable animal or other shapes. The three-dimensional food products are produced using one or more multi-orifice extruders to increase production rates while reducing cutter speeds to prevent undesirable scattering and deformation of the pieces.

SUMMARY OF THE INVENTION

The present invention provides apparatus and a method for the production of three-dimensional food products such as crackers, cookies, puffed snacks, glassy half-products which are expandable upon subsequent heating, ready-to-eat cereals, confections, pasta, and pet foods on a mass production basis. A farinaceous-based dough or confectionery composition is fed to a plurality of dies which shape the food composition into at least one shape conforming to the orifices of the dies. The shaped extrudate rope obtained from each die is cut by a first cutting means which passes across only a portion of each of the orifices of the dies. The first cutting means thus only partially cuts each of the shaped extrudate ropes. Second cutting means pass across the entire orifice of each of the dies to completely cut each of the partially cut extrudate ropes into individual pieces. The dough or confectionery pieces which are obtained are three-dimensional in that they are partially cut at an angle transverse to the direction of extrusion.

The use of a multi-port extrusion die permits higher mass flow rates and thus greater dough piece production rates at lower cutter speeds. The use of lower cutter speeds increases accuracy of cutting and reduces scattering of the pieces. The larger the number of die orifices at a given production rate, the slower is the rate of flow through each orifice. The slower rates increase shape definition of the extrudates. Deformation of the individual pieces is also reduced by decreasing the speed at which they impact equipment parts upon being cut. In addition, the use of multiple orifices permits the use of lower pressure for a given production rate which positively impacts the texture of the final product. The plurality of dies may be fed by a calendar press or preferably an extruder, most preferably an extruder with a plurality of conveying screws.

In embodiments of the present invention, the first and second cutting means may be arranged or mounted on: a) a continuous or endless band or chain, b) a reciprocating or oscillating frame which moves in a closed path, or c) a rotating shaft. The continuous or endless band or chain and reciprocating or oscillating cutter embodiments are preferred because the cutting motion imparts a lateral or straight line force rather than a centrifugal force to the dough pieces as they are cut. The lateral force provides for more uniform controlled distribution of the pieces, for example, on to a conveyor belt. It also tends to reduce shape deformation of the pieces. The continuous band or chain and oscillating cutter arrangement also can be used to cut the extrudates from dies which are arranged in two or more rows thereby increasing production over a rotating cutter. Embodiments which use a continuous band or chain are preferred because higher production rates may be achieved by the continuous movement of the cutters across the die orifices compared to the movement achieved in the oscillating cutter embodiments. A continuous or endless chain is most preferred for holding of the first and second cutting means.

In embodiments of the present invention, such as in the continuous band or chain, and in the rotating cutter embodiments, the first cutting means, which passes across only a portion of each of the orifices, may be one or more cutting blades which are shorter than the blades of the second cutting means. Each blade of the second cutting means passes across the entire orifice of each of the dies. In the oscillating or reciprocating cutter embodiments of the present invention, the blades of the first cutting means and the blades of the second cutting means are preferably the same, but may be different. Each blade may pass across only one die orifice or a plurality of die orifices in a given row of dies.

The doughs which pass through the dies for cutting into three-dimensional pieces may be raw, partially cooked or baked, or fully cooked, baked or expanded. The raw doughs, partially cooked doughs, or glassy half-products may be heated subsequent to cutting into three-dimensional shapes by means of a convection oven, band oven, microwave oven, radio frequency oven, frying or oil bath, boiling water bath, fluidized bed heater, or combination thereof, for example.

In embodiments of the present invention, the dough may be cut just prior to or during substantial expansion or puffing of the dough, such as in the production of puffed snacks and ready-to-eat cereals. In the production of cracker-type products, for example, the dough is preferably cut prior to any substantial expansion. The cut, essentially raw dough may then be transferred by a conveyor belt to an oven for baking and leavening into three-dimensional baked goods.

Conventional snack, half-product, ready-to-eat cereal, cracker, cookie, pasta, confectionery and pet food compositions may be used in producing the three-dimensional food products of the present invention. However, in the production of three-dimensional crackers, the mount of water and an enzyme composition comprising one or more proteolytic enzymes are preferably used to: a) increase the expandability or leavening ability of cracker doughs and b) reduce cracker hardness which may result upon baking cracker doughs which have undergone high extrusion pressures.

High extrusion pressures tend to change the air cells in a dough. Generally the greater the pressure the lesser the degree of expansion upon subsequent baking and the harder the texture of the cracker. It has been found that cracker doughs having: 1) a water content of from about 15% by weight to about 35% by weight, preferably front about 17% by weight to about 21% by weight of the dough, most preferably from about 18% by weight to about 20% by weight of the dough, and 2) from about 9 grams to about 20 grams, preferably from about 11 grams to about 17 grams of proteolytic enzyme per 100 lbs of the flour are extrudable doughs which retain their shape during transport to baking ovens and are bakeable into a tender cracker.

The use of an emulsifier, such as sodium stearyl lactylate, and a chemical leavening agent, such as ammonium bicarbonate, also promote a tender texture in the three-dimensional crackers or cracker-like products of the present invention.

The three-dimensional farinaceous-based products or confections such as chewing gum of the present invention may be in the form of animals, cars, people, dinosaurs, outer space creatures, insects and the like. The baked goods such as crackers or confections of the present invention may be standable on two, three, four, or more individual legs or extremities.

DETAILED DESCRIPTION OF THE INVENTION

The apparatus for the production of three-dimensional food products in accordance with the present invention comprises: 1) first cutting means, such as at least one short blade, for only partially cutting each of a plurality of shaped extrudate ropes, and 2) second cutting means, such as at least one long or cut off blade, for completely cutting each of a plurality of the partially cut extrudate ropes to obtain three-dimensional food pieces. In preferred embodiments, the partial cutting and the complete cutting are within generally parallel planes of each extrudate. The first and second cutting means may form part of or be attached, mounted or arranged on a continuous or endless loop, belt, band or chain in embodiments of the present invention. In other embodiments, the cutting means may be held by or form part of a reciprocating or oscillating frame or be mounted on a rotating shaft. The first and second cutting means are preferably mounted on at least one endless or continuous chain or band, most preferably at least one endless or continuous chain.

Figure 1:
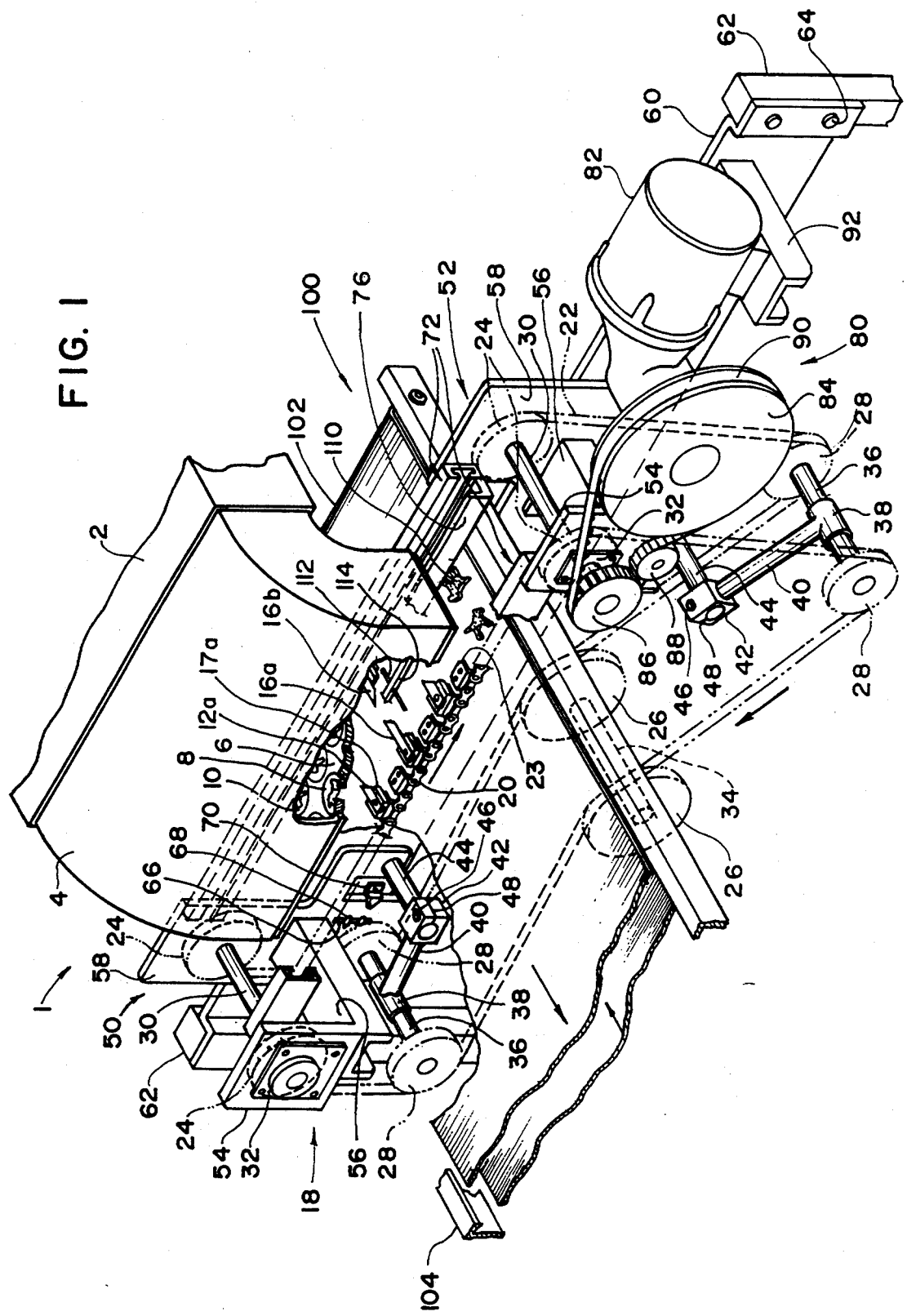
FIG. 1 is a perspective view of a continuous or endless moving chain cutter embodiment of the present invention.

A continuous or endless chain multi-orifice cutting apparatus 1 for producing three-dimensional food products in accordance with the present invention is shown in FIG. 1. The apparatus comprises an extruder 2 which feeds a dough through elbow 4 to die head or die plate 6 which is located at the bottom end of elbow 4. In the production of crackers, the extruder 2 is preferably a modified pretzel extruder containing one or more sets of individual, non-intermeshing screws 3 (shown in FIG. 2) for feeding dough through the elbow 4 to the die head 6. A hopper (not shown) is used to feed the dough to the extruder screws 3.

In embodiments of the present invention, the cracker dough or other dough may be fed to the die head or die plate 6 by means of a continuous mixer, or counter-rotating rolls, such as those of a calender press, instead of by an extruder 2. An extruder is the preferred means for feeding the dough through the dies.

The dough may be produced in at least one mixing apparatus such as a batch mixer, continuous mixer, or extruder, and then transferred to the forming or shaping extruder 2 via the hopper. In other embodiments of the present invention, the dough ingredients may be added to and mixed to form a dough within an extruder or continuous mixer having a plurality of dies which are in association with the first and second cutting means.

In the production of partially cooked products, half-products, or fully expanded products such as ready-to-eat cereals and puffed snacks, a cooker extruder is preferably used to cook and feed the food composition to the die head 6.

In the production of three-dimensional chewing gums, a conventional chewing gum extruder may be used to feed the gum composition to the die plate 6.

Known convection ovens, band ovens, microwave ovens, radio frequency ovens, fryers or off baths, fluidized bed heaters, or jet zone ovens, or combinations thereof, such as a serially arranged microwave oven and a jet zone oven, may be used in the present invention. These devices may be used, for example, to bake raw or partially cooked doughs which have been cut into three-dimensional shapes. Three dimensional half products may, for example, be puffed or expanded by means of a microwave oven, jet zone oven, fryer, or combinations thereof.

In the embodiment of FIG. 1, two rows of dies or die inserts 8, 10 are incorporated into the die plate 6 which is oriented for downward, vertical extrusion of the extrudate. Although this arrangement is preferred, the invention may be practiced with one row of dies or more than two rows of dies. It may also be practiced with horizontal extrusion of the extrudate. The downstream dies or die inserts 8 may be different from the upstream dies or die inserts 10 to provide a mixture of differently shaped farinaceous-based dough pieces 110. Also, the dies within a given row may be differently shaped. Each die may have an adjustment device to increase or decrease the flow rate of the dough mass in order to compensate for different shaped dies. The extrudates from the downstream row of dies 8 are cut by the downstream short blades 12a and downstream long blades or cut off blades 16a. The extrudates from the upstream row of dies 10 are cut by the upstream short blades 12b (not shown in FIG. 1) and the upstream long blades or cut off blades 16b.

The single blade supports 17a are connected to the chain assembly 18 by means of the elbow-shaped blade support connectors 2,3. The chain assembly 18 comprises a downstream chain 20 for carrying the downstream blades 12a, 16a and an upstream chain 22 for carrying the upstream blades 12b, 16b. The blade support connectors 23 are attached to the links of the chains 20, 22. As shown in FIG. 1, the blades 12a, 12b, 16a, 16b and the blade supports need not be attached to every blade support connector 23. Thus, cutting rates or cutting frequencies may be increased by adding additional blades 12a, 12b, 16a, 16b and corresponding blade supports 17a to the blade support connectors 23.

The blades on each chain are preferably about equally spaced along the length of each chain so as to obtain three-dimensional dough pieces wherein the partially cut portions further removed from the die plate and the partially cut portions closest to the die plate have substantially the same thickness. However, the blades may be unequally spaced to provide different thicknesses to the partially cut sections in the direction of extrusion. Each chain is preferably provided with at least one short blade and at least one long blade per die. This arrangement permits simultaneous cutting of the extrudates from the dies of each row. Also, for a given chain length, the greater the ratio of blades to dies, the higher the production rates can be at a given chain or cutter speed.

Chain Tension Adjustment

The downstream chain 20 and the upstream chain 22 form belts which engage upper sprocket wheels 24, lower sprocket wheels 26, and chain tension adjusting lower sprocket wheels 28. The upper sprocket wheels 24 are connected by upper sprocket wheel axles 30. The optional lower fixed sprocket wheels 26 are connected by optional lower sprocket wheel axle 34. The chain tension adjusting sprockets 28 are connected by tension adjusting lower sprocket axles 36. The upper sprocket wheel axles 30 are mounted in bearing assemblies 32.

The tension adjusting lower sprocket axles 36 pass through and are fixedly held by sleeves 38. Sleeves 38 and support arms 40 form a T-shaped structure. The ends of the supports arms 40 which are not attached to the sleeves 38 are journaled into a socket of double socket joints 42. The other socket of double socket joints 42 receive one end of support rods 44. Support rods 44 are substantially perpendicular to support arms 40. Support arms 40 may be welded or otherwise secured to sleeves 38 and double socket joints 42. Double socket joints 42 are rotatable about support rods 44 so as to adjust the tension of chains 20 and 22.

Figure 2:
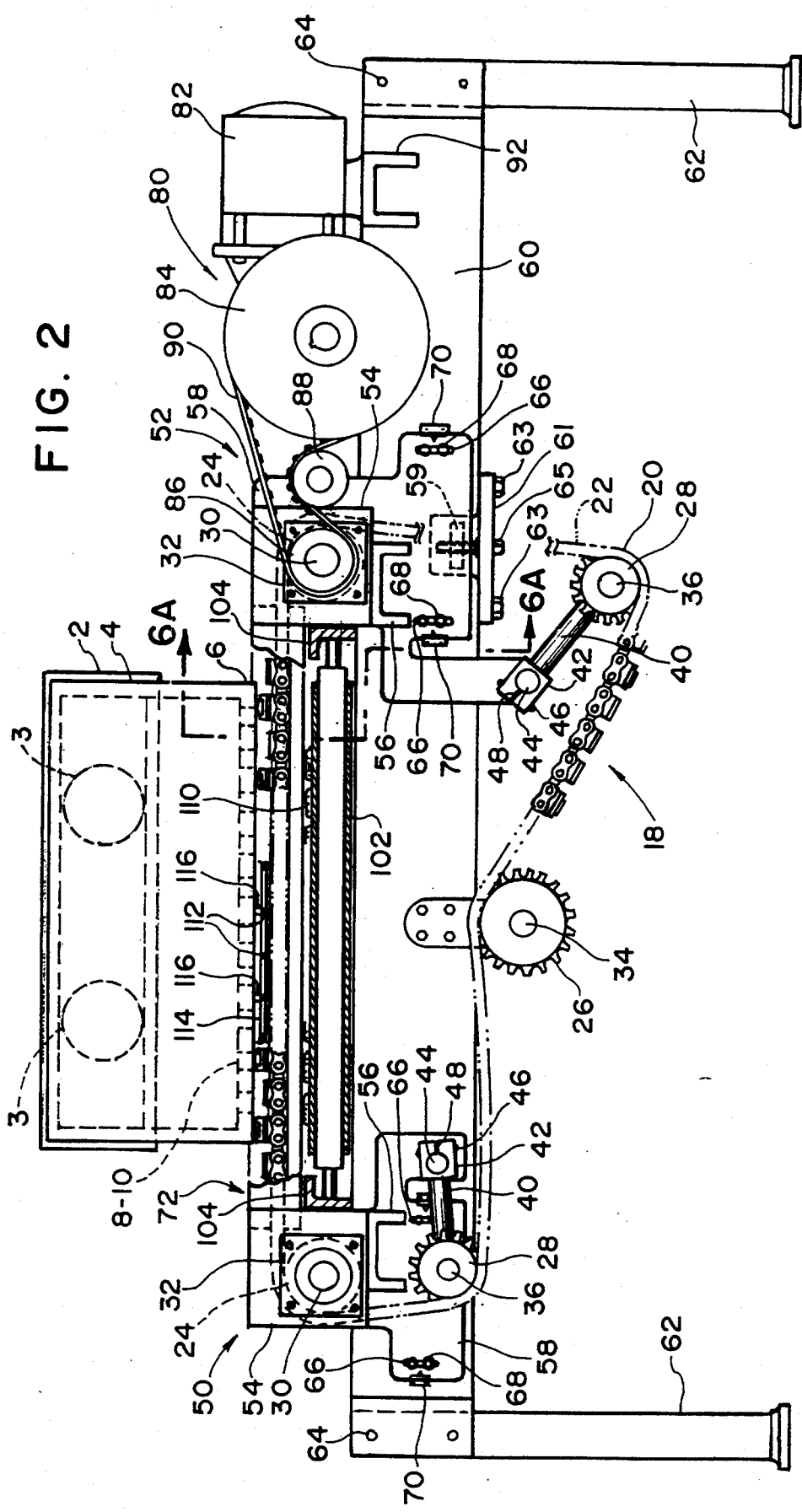
FIG. 2 is a front view of the FIG. 1 embodiment.

As shown in FIG. 2, double socket joints 42 each contain a slit 48 which extends from the outer surface to the bore in which support rods 44 rotate. Tightening of bolts 46 closes slits 48 and prevents rotation of support rods 44 within the bore or socket of double socket joints 42 thereby locking the chain tension adjusting sprockets 28 in a desired position. The support rods 44 are attached by welding or bolts, for example, to chain height adjusting supports 50 and 52.

In alternative embodiments, the chain tension may be adjusted by providing means for adjusting the distance between the upper sprocket wheels 24 in a direction transverse to the direction of movement of the conveyor belt 102. Increasing the distance between the upper sprocket wheels 24 would increase the tension in chains 20 and 22. In these embodiments, the optional lower fixed sprocket wheels 26, the tension adjusting lower sprocket wheels 28, and their supporting structures such as axles 34 and 36, respectively, may be eliminated. The adjustment means for the upper movable sprocket wheels may include hydraulic systems.

Chain Height Adjustment

Figure 3:
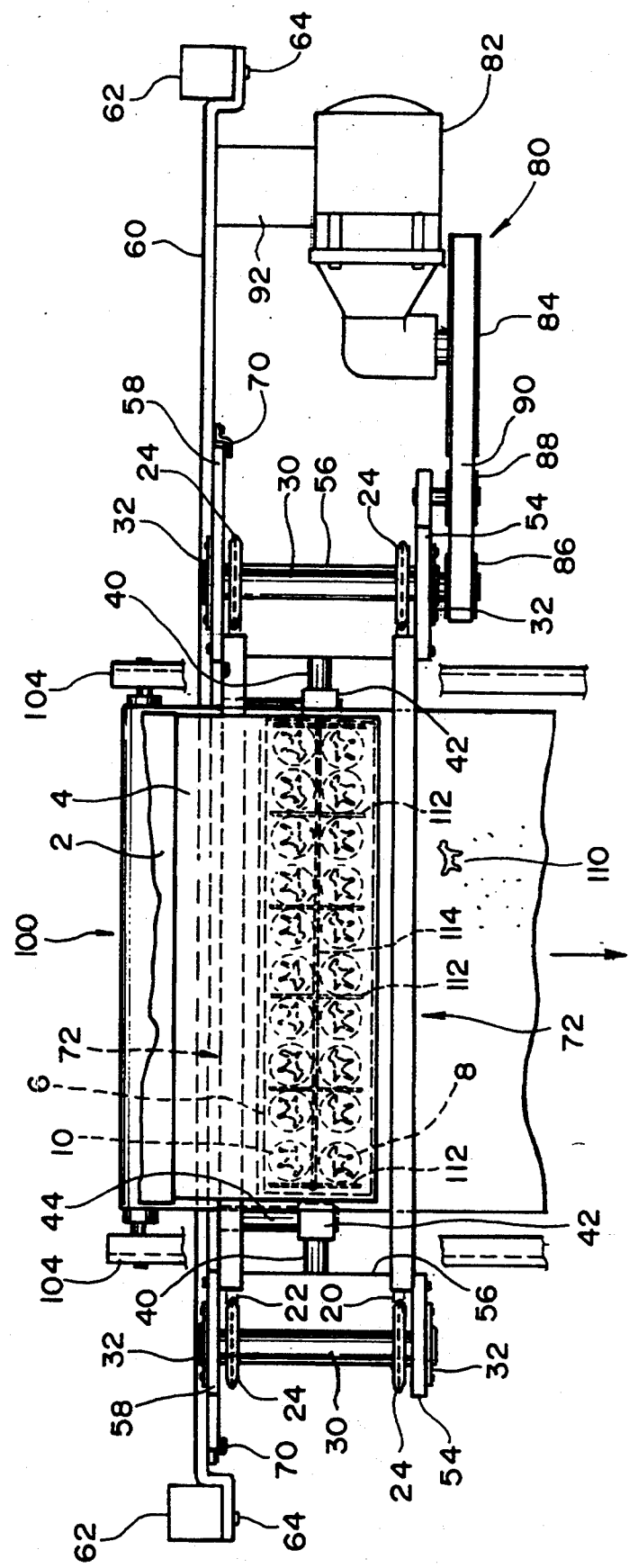
FIG. 3 is a top view of the FIG. 1 embodiment.
Figure 4:
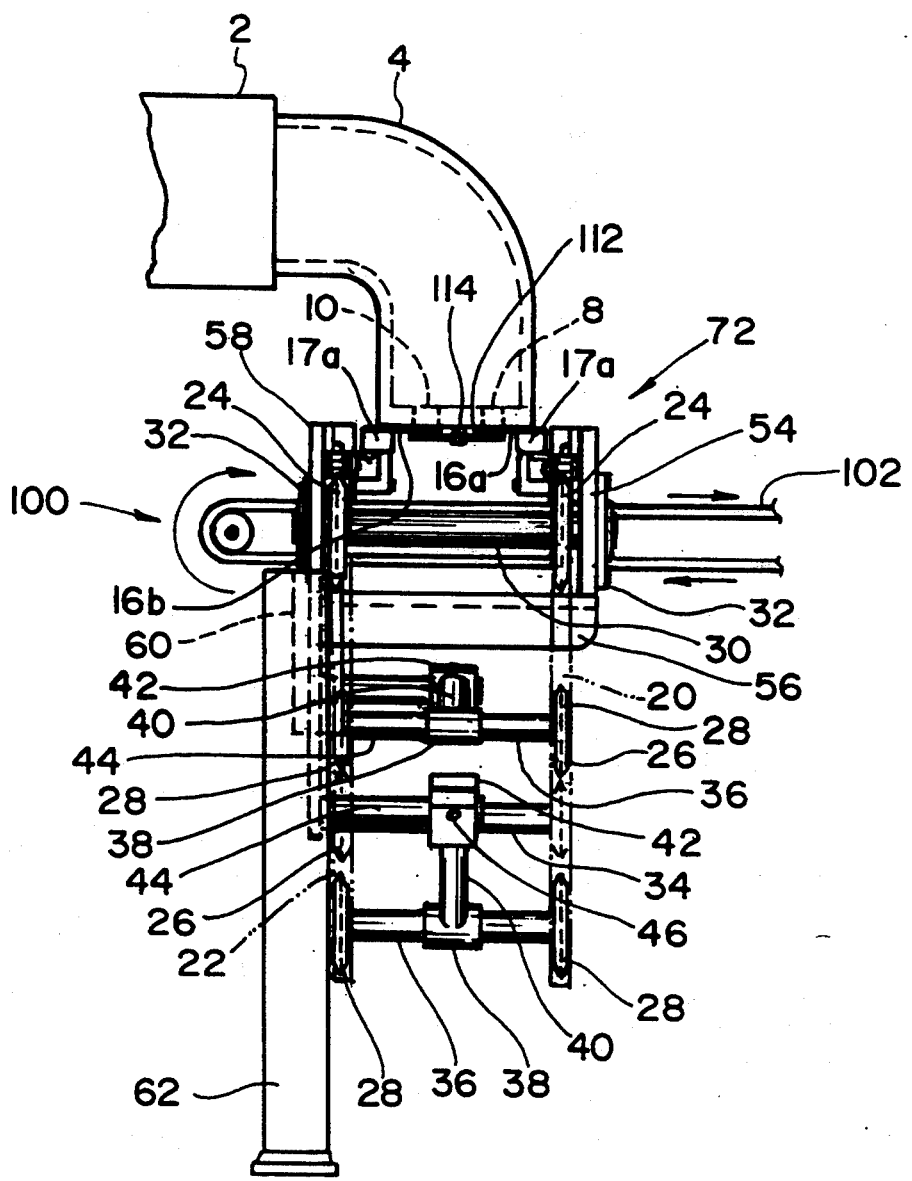
FIG. 4 is a left side view of FIG. 2.

The chain height adjusting supports 50, 52 are vertically adjustable to position the blades 12a, 12b, 16a, and 16b up against the die end plate 16 for cutting the extrudate dough as it exits the orifices of the downstream and upstream dies 8 and 10. Downward movement of the chain height adjusting supports 50, 52 lowers the blades 12a, 12b, 16a and 16b for adjustment, cleaning, or replacement. As shown in FIGS. 1, 3, and 4, the chain height adjusting supports 50, 52 comprise vertical supports 54, horizontal supports 56, and vertical back plates 58. Vertical supports 54 are connected to vertical back plates 58 by horizontal supports 56 to provide a generally U-shaped structure. Bearing assemblies 32 are attached to vertical supports 54 and vertical back plates 58. Upper sprocket wheel axles 30 thus bridge vertical supports 54 and vertical back plates 58.

Figure 6A:
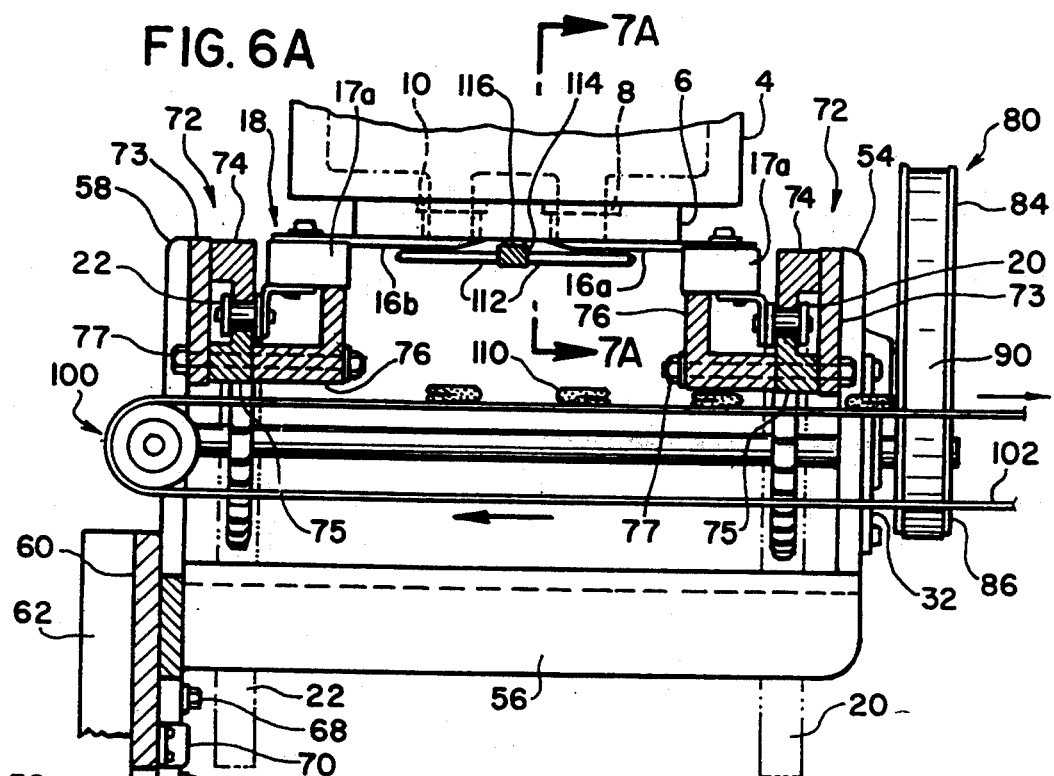
FIG. 6A is a cross-sectional view taken along line 6A of FIG. 2, showing the chain guide assembly, the single blade support and blade cleaner arrangement, and blade height adjustment of the FIG. 1 embodiment.

As shown in FIGS. 2 and 6A a tongue 59 may be welded to the back of back plate 58 for adjustable attachment of back plate 58 to main frame 60. Attached to the bottom of main from 60 is a stationary bracket 61. Stationary bracket 61 may be attached to frame 60 via screws 63. Main frame 60 is supported in a given position by support legs 62. Attachment of main frame 60 to support legs 62 may be made by bolts 64 or other fastening means. Vertical back plates 58 abut the main frame 60 and may be moved vertically and relative thereto by means of vertical bolt 65 and height adjusting bolts 68. Vertical bolt 65 passes through tongue 59 and bracket 61. Loosening of height adjusting bolts 68 permits vertical movement of the vertical back plates 58 as limited by the height adjusting slots 66 of back plates 58 as shown in FIG. 2. Upon loosening height adjusting bolts 68 the height adjustment may be made by rotation of bolt 65. As shown in detail in FIG. 6A, bolt 65 is rotatably attached to bracket 61 for upward and downward adjustment of plate 58 via tongue 59. Repositioning of the vertical back plates 58 to a given position may be judged using height adjustment markers or gauges 70. Height adjustment may also be achieved by other means, such as a crank wheel which is rotatable in a manner similar to bolt 65, or by hydraulic lifting means.

Chain Guide Assemblies

The chain guide assemblies 72, shown in FIG. 1 through 4, for example, provide vertical and horizontal stability to the chains 20, 22 and the blades 12a, 12b, 16a, and 16b attached to the chains for accurate and consistent cutting of the extrudates as they exit the dies 8, 10.

Figure 5A:
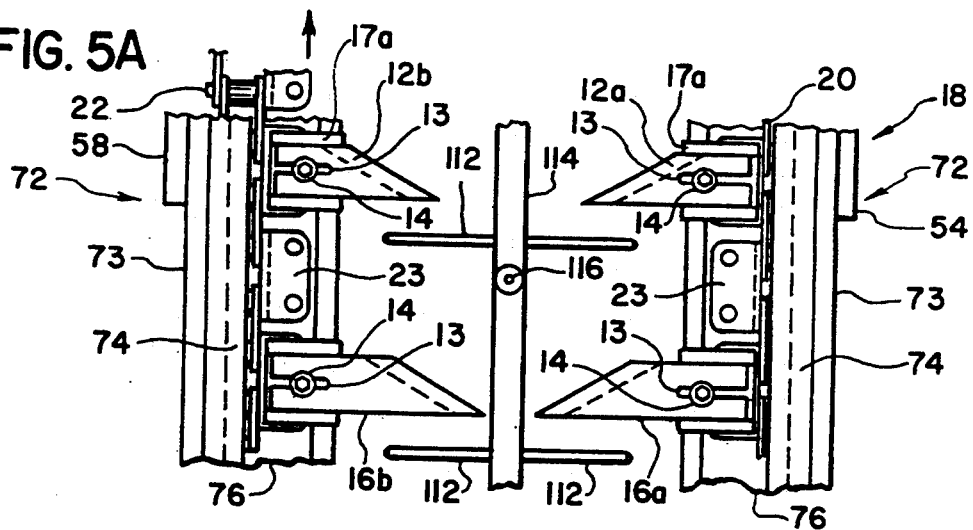
FIG. 5A is a partial top view of the preferred single blade support and blade cleaner arrangement used with the continuous moving chain cutter of FIG. 1.

As shown in detail in FIGS. 5A and 6A, each chain guide assembly 72 comprises chain guide support 73, upper chain guide 74, lower chain guide 75 (not shown in FIG. 5A), blade stabilizer 76, and blade stabilizer bolt 77 (not shown in FIG. 5A). The chain guide supports 73 may be attached by bolts (not shown) to the vertical supports 54 and to the vertical back plates 58 as shown in FIGS. 5A and 6A. The upper chain guides 74 and lower chain guides 75 are L-shaped in cross-section, but other shapes may be used. The guides 74, 75 abut the chain guide supports 73 and may be fastened thereto by means of bolts or screws. The guides 74, 75 are preferably made of a plastic having a low coefficient of friction or "self lubricating property," such as nylon or polytetrafluoroethylene to reduce friction between the chains 20, 22 and their guides 74 and 75.

As shown in FIG. 6A, the non-abutting leg or side of the L-shaped chain guides 74, 75 form a channel or a slot through which the chains 20, 22 pass. The upper chain guides 74 limit upward as well as lateral movement of the chains 20, 22. The lower chain guides 75 limit downward and lateral movement of the chains 20, 22.

Figure 6B:
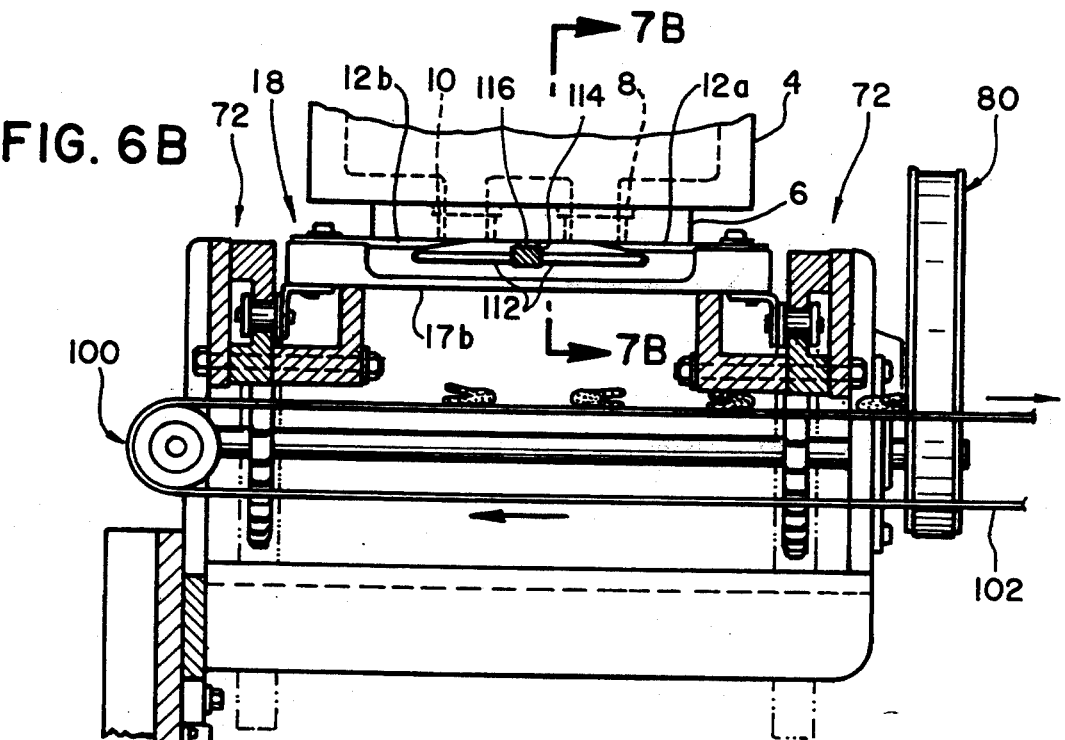
FIG. 6B is a cross-sectional view similar to the view shown in FIG. 6A except the single blade supports for the short blades have been replaced with the alternative double blade support shown in FIG. 5B.

The blade stabilizers 76 are also L-shaped in cross-section, but other shapes may be used. They may be attached to the lower chain guides 75 by means of blade stabilizer bolts 77. The blade stabilizer bolts 77 may also pass through the chain guide supports 73. One leg or side of the blade stabilizers 76 are shown abutting against the lower chain guides 75. The other leg of the blade stabilizers 76 may abut against the bottom of the single blade supports 17a or, as shown in FIG. 6B against optional double blade supports 17b. The blade stabilizers 76 support the blade supports 17a or 17b, to prevent vertical wobbling of the blades 12a, 12b, 16a, and 16b as they pass across the orifices of the dies 8, 10.

Figure 7A:
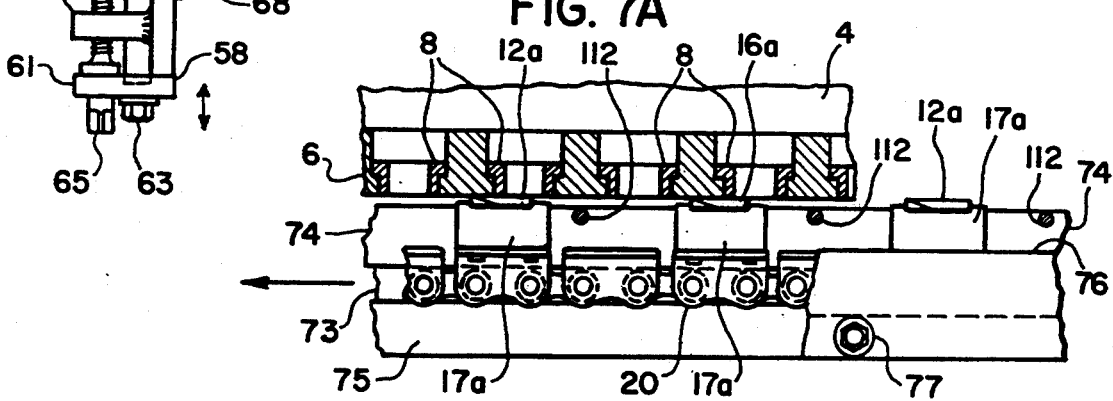
FIG. 7A is a partial cross-sectional view along line 7A of FIG. 6A showing the downstream blades, single blade support, and blade cleaning dowels of the FIG. 5A embodiment.
Figure 5B:
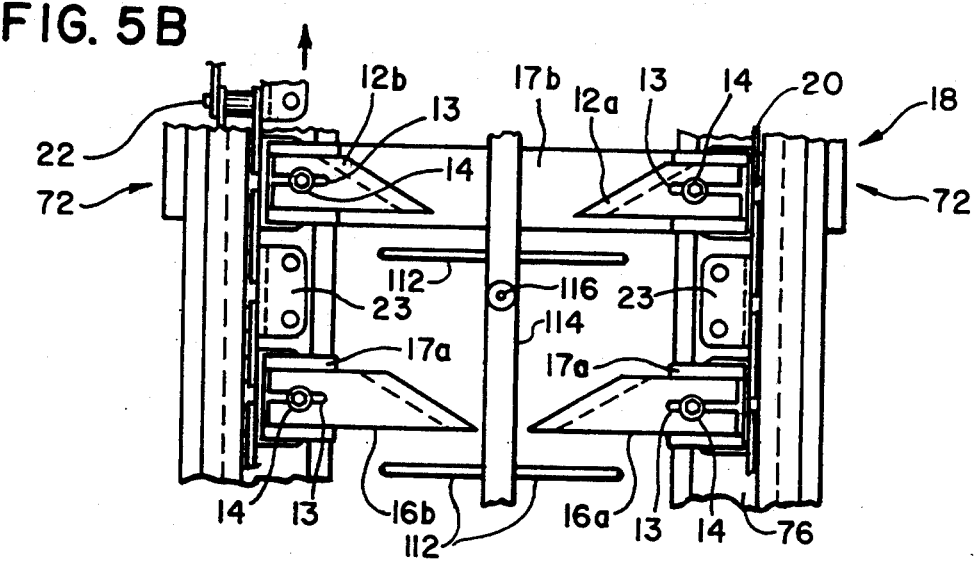
FIG. 5B is a partial top view of an alternative embodiment having a double blade support and blade cleaner arrangement which may be used with the continuous moving chain of FIG. 1.
Figure 7B:
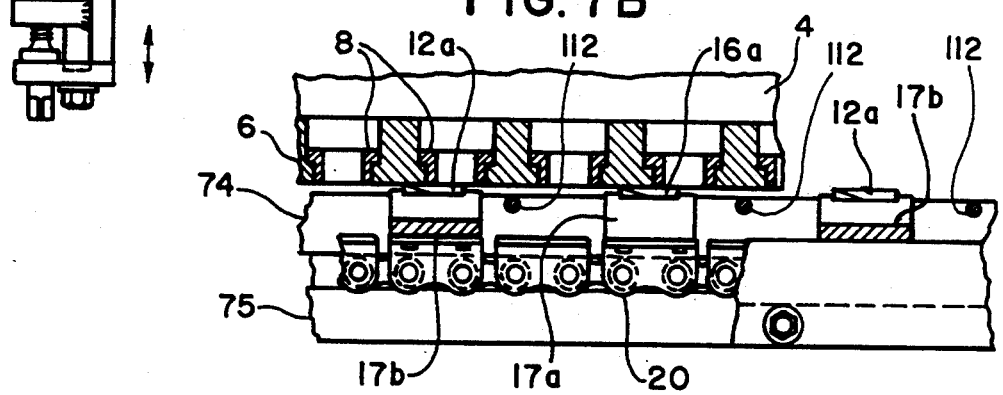
FIG. 7B is a partial cross-sectional view along line 7B of FIG. 6B, showing the downstream blades, double blade support and blade cleaning dowels of the FIG. 5B embodiment.

As shown in FIGS. 5B, 6B, and 7B, the chain guide assembly 72 may be used to guide chains 20, 22 which contain double blade supports 17b as well as single blade supports 17a.

Figure 6C:
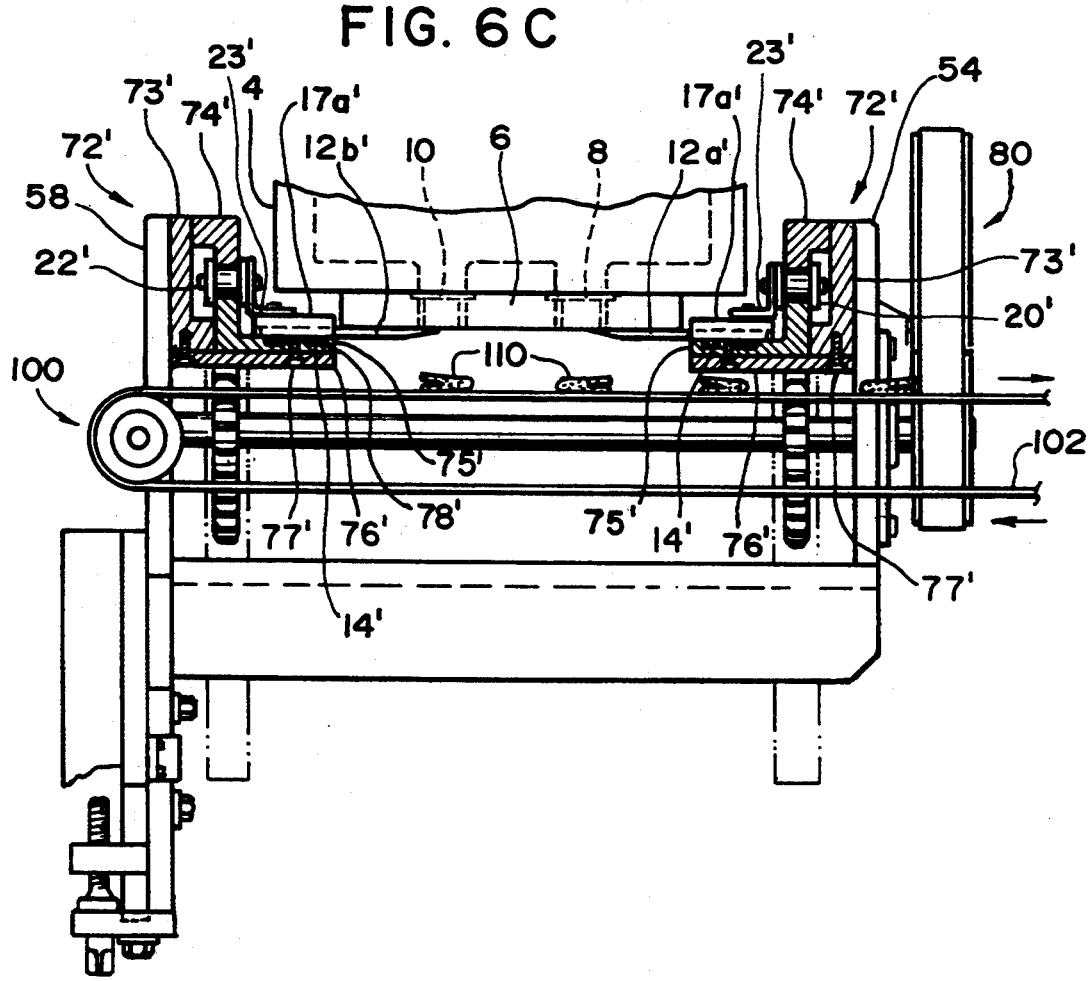
FIG. 6C is a cross-sectional view similar to the view shown in FIG. 6A except the optional blade cleaner arrangement has been removed and the chain guide assembly has been modified to permit raising of the conveyor belt closer to the die orifices.

FIG. 6C shows a preferred chain guide assembly 72' which permits the conveyor belt 102 to be positioned closer to the die orifices 8, 10. The resultant reduction in the distance the dough pieces 110 fall from the die orifices 8, 10 to the conveyor belt 102 reduces scattering and deformation of the pieces 110. It provides a substantially even distribution of the pieces 110 across the belt 102 for subsequent transferring and baking.

Figure 5C:
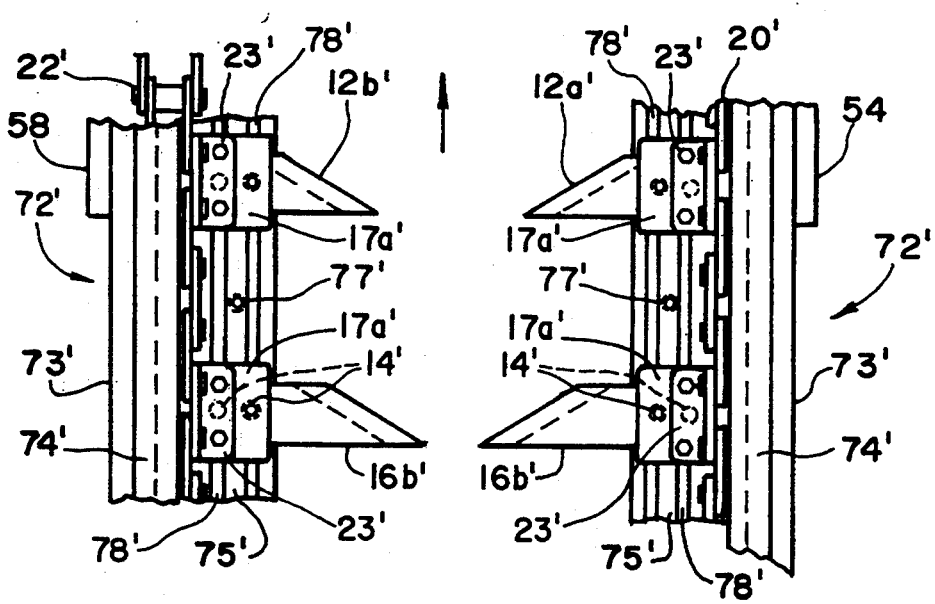
FIG. 5C is a partial top view of an alternative preferred embodiment having a single blade support arrangement without a blade cleaner arrangement which may be used with the continuous moving chain of FIG. 1.

As shown in detail in FIGS. 5C and 6C each chain guide assembly 72' comprises chain guide support 73', upper chain guide 74', lower chain guide 75', blade stabilizer 76' (not shown in FIG. 5C), and blade stabilizer bolt 77'. The chain guide supports 73' may be attached by bolts (not shown) to the vertical supports 54 and to the vertical back plates 58 as shown in FIGS. 5C and 6C. The upper chain guides 74' and lower chain guides 75' are L-shaped in cross-section, but other shapes may be used. The guides 74', 75' abut the chain guide supports 73' and may be fastened thereto by means of bolts or screws. The guides 74', 75' are preferably made of a plastic having a low coefficient of friction, such as nylon or polytetrafluoroethylene to reduce friction between the chains 20', 22' and their guides 74', 75'.

As shown in FIG. 6C, the non-abutting leg or side of the L-shaped chain guides 74', 75' form a channel or a slot through which the chains 20', 22' pass. The channel or slot is above the plane through which the blades 12a', 12b', 16a', and 16b' travel as they cut the extrudates from the dies 8, 10. The upper chain guides 74' limit upward as well as lateral movement of the chains 20', 22'. Longitudinal grooves or channels 78' may be provided in the lower chain guides 75' to accommodate blade holding bolts or screws 14' which fasten the blades 12a', 12b', 16a', 16b' to single blade supports 17a'. The blade supports 17a' are fastened to the chains 20',22' via L-shaped blade support connectors 23' as shown in FIG. 5C and 6C.

The blade stabilizers 76' are rectangular in cross-section, but other shapes may be used. They may be attached to the chain guide supports 73' and lower chain guides 75' by means of blade stabilizer bolts 77'. A portion of the blade stabilizers 76' are shown abutting against the lower chain guides 75' to support them against the bottom of the single blade supports 17a'. The blade stabilizers 76' support the blade supports 17a' to prevent vertical wobbling of the blades 12a', 12b', 16a', and 16b' as they pass across the orifices of the dies 8, 10.

Chain Drive

The downstream chain 20 and upstream chain 22 are driven by chain drive 80 as shown, for example, in FIGS. 1 and 3. Chain drive 80 comprises drive motor 82, main pulley 84, drive pulley 86, belt tension adjusting pulley 88, drive belt 90, and motor support bracket 92. Main pulley 84 is connected to drive pulley 86 by means of drive belt 90. The tension in drive belt 90 may be adjusted by means of belt tension adjusting pulley 88. Main pulley 84 is connected to the drive shaft of drive motor 82. The motor 82 is supported on motor support bracket 92 which is attached to mainframe 60. The drive pulley 86 is located on one of the upper sprocket wheel axles 30.

Rotation of the drive pulley 86 by means of the main pulley 84, drive belt 90 and drive motor 82 causes rotation of the upper sprocket wheel axle 30 upon which the drive pulley 86 is located. This rotation of the axle 30 causes rotation of the upper sprocket wheels 24 which are on the same axle 30 as the drive pulley 86. Rotation of these upper sprocket wheels 24 causes movement of the downstream chain 20 and upstream chain 22 together with rotation of the remaining upper sprocket wheels 24, the optional fixed lower sprocket wheels 26, and the chain tension adjusting lower sprockets 28. The chains 20, 22 move in a continuous closed loop to partially cut and completely cut the dough as it exits from the plurality of downstream dies 8 and plurality of upstream dies 10.

Chain drive 80 may also be used to similarly drive chains 20' and 22' of the embodiment shown in FIGS. 5C and 6C.

Conveyor Belt Assembly

The conveyor belt assembly 100 is located below the downstream dies 8 and upstream dies 10 as shown, for example, in FIGS. 1, 3, and 4. The conveyor belt assembly 100 passes through the loops formed by the downstream chain 20 and upstream chain 22. It comprises a continuous belt 102 and conveyor support arms 104 which support the belt 102 in conventional manner. The three-dimensional dough pieces 110 after cutting by the blades 12a, 12b, 16a, and 16b fall onto the continuous belt 102 and are conveyed in a direction from the upstream dies 10 to the downstream dies 8.

To assist in providing an even distribution of dough pieces 110 across the belt 102, channeling devices or partitions may be supported upon the conveyor support arms. The partitions may be arranged between the dies 6, 8 to provide channels which extend in the direction of movement of the belt 102.

However, the continuous belt 102 is preferably placed as close as possible to the die orifices to maintain a consistent dough piece falling pattern onto the belt 102. This may be accomplished by locating at least a portion of the chains above the bottom of the die plate 6 as shown, for example, in FIG. 6C.

Blade Cleaning

The apparatus 1 for producing three-dimensional food products may be equipped with means for cleaning the upstream and downstream long and short blades 12a, 12b, 16a, and 16b. In some embodiments, blade cleaning dowels 112 are spaced, preferably at about the mid-point between successive die orifices as shown in FIG. 3. The blade cleaning dowels 112 are secured at one end to a dowel support bar 114. The dowel support bar 114 is located between the downstream row of dies 8 and the upstream row of dies 10. The support bar is preferably located at about the mid-point between two rows of dies 8 and 10. As shown in FIG. 4, FIG. 6A, and FIG. 7A the blade cleaning dowels 112 are spaced from the die plate 6 so as to permit travel of the blades 12a, 12b, 16a, and 16b across the dies 8, 10. The support bar spacer 116 may be used to adjust the distance which the cleaning dowels 112 are positioned below the die plate 6. The blade cleaning dowels 112 are spaced below the die plate so that any dough pieces 110 which may stick to the blades 12a, 12b, 16a, or 16b are knocked off of the blades by the blade cleaning dowels 112.

Blade Supports And Blades

The blade supports 17a and 17b are preferably provided with a groove on their top surfaces for receiving the blades 12a, 12b, 16a and 16b as illustrated in FIGS. 5A, 5B, 7A, and 7B. In the preferred embodiment shown in FIGS. 5C and 6C the groove is provided on the bottom surface of the blade supports 17a. The grooves tend to prevent movement of the blades relative to the blade supports 17a, 17a', and 17b. The blades, 12a, 12b, 16a and 16b are optionally provided with a slot 13 which permits adjustment of the position of blades 12a, 12b, 16a, and 16b in relation to the orifices of dies 8, 10. Thus, the adjusting slots 13 allow for adjustment of the blades to vary the portion of the orifices which the blades pass over. The blades 12a, 12b, 16a, and 16b are secured to the blade supports 17a, 17b by means of blade adjustment screws 14 which pass through the blade adjustment slots 13 and screw into the blade supports 17a or 17b. In the embodiment of FIGS. 5C and 6C the blades 12a', 12b', 16a', 16b' are secured to blade supports 17a' by screws 14' which pass through holes in the blades.

In the embodiment of FIGS. 5B, 6B, and 7B, an optional double blade support 17b is used to connect the downstream chain 20 to the upstream chain 22. The double blade supports 17b tend to reduce vertical and lateral movement of the blades 12a, 12b, 16a, and 16b. However, they are less preferred than the single blade supports 17a shown in FIGS. 5A, 6A, and 7A became they tend to interfere with the free fall of the dough pieces 110 at high cutter speeds. The double blade supports 17b, if used, preferably only support the short blades 12a, 12b while the long blades 16a, 16b are supported by the single blade supports 17a. This arrangement permits the pieces to fall when cut by the long blades 16a, 16b without interference from the double blade supports 17b.

As shown in FIG. 6B, the central portion of each of the double blade supports 17b is thinner than the two end portions so as to accommodate the optional blade cleaning dowels 112 and blade cleaning support bar 114 located above.

As shown in FIGS. 1, 5A, and 5B, for each chain 20, 22 the short blades 12a and 12b and the long blades 16a and 16b are placed on alternating positions on the chain For example, on downstream chain 20, a downstream short blade 12a is followed by a downstream long blade 16a which in turn is followed by a downstream short blade 12a which in turn is followed by a downstream long blade 16a and so on. However, a plurality of short blades may be placed between successive long blades to create a plurality of partial cuts on each dough piece.

Although individual blades are preferred, the short blades and long blades may be provided on or form pan of a continuous or endless band such as a band saw blade. However, an individual blade and chain arrangement such as shown in FIG. 5A is preferred for blade adjustment and replacement purposes.

Figure 5D:
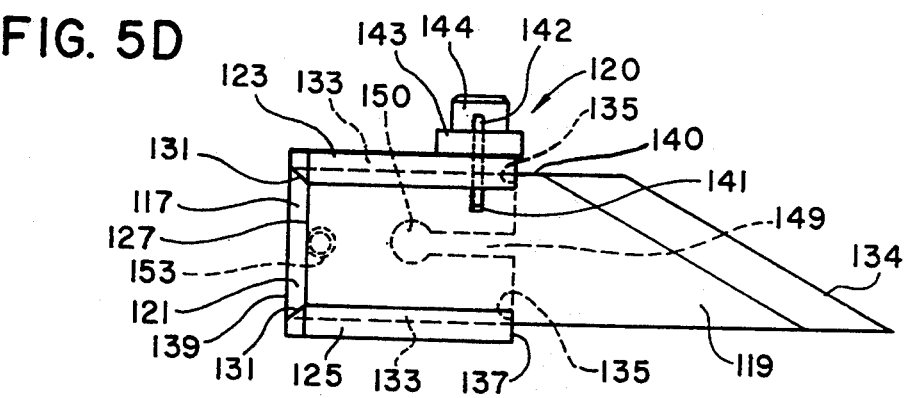
FIG. 5D is a bottom view of a preferred single blade support with a preferred long blade or cut off blade secured therein for complete cutting off of the extrudates.
Figure 5E:
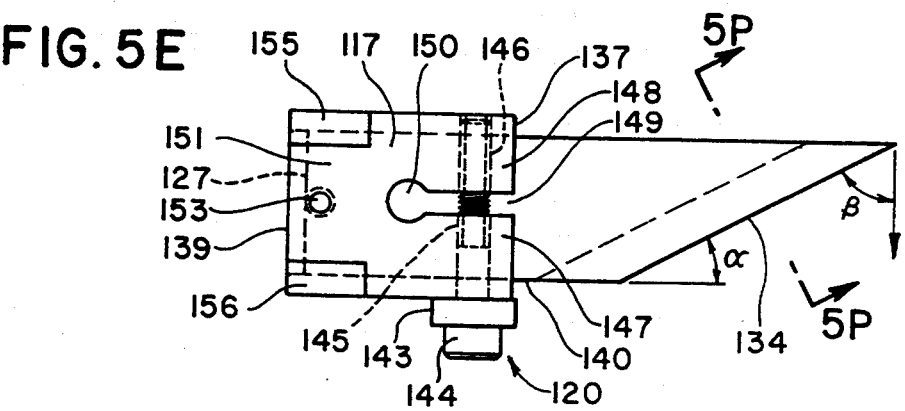
FIG. 5E is a top view of the preferred single blade support and long blade of FIG. 5D.
Figure 5G:
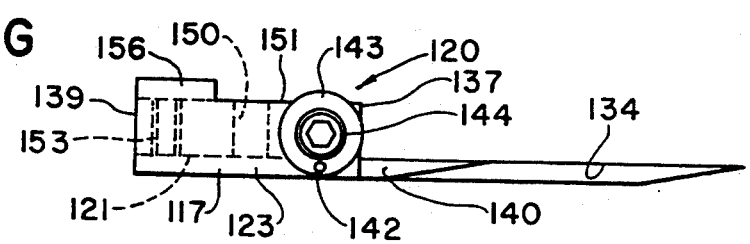
FIG. 5G is a from view of the preferred single blade support and long blade of FIG. 5D.

A preferred single blade support 117 and preferred long blade 119 for attachment to downstream chain 20' for complete cutting of the extrudate ropes are shown in FIGS. 5D, 5E, 5F, and 5G. As shown in these figures, the long blade 119 is secured to the bottom 121 of the blade support 117 by a bolt assembly 120. The blade 119 abuts the bottom of the support 117 between two ridges: leading ridge 123, and trailing ridge 125. The ridges 123, 125 of the blade support 117 may have chamfered ends 126 as shown in FIGS. 5D and 5G.

Figure 5F:
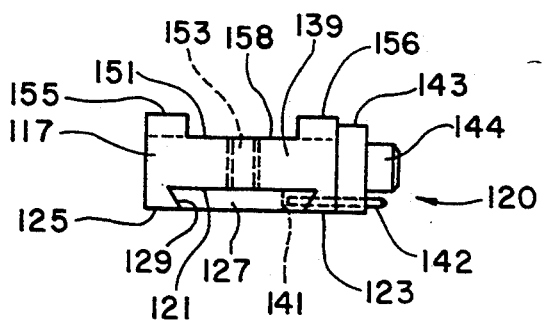
FIG. 5F is a left side view of the preferred single blade support and long blade of FIG. 5D.

The non-cutting end 127 of the blade 119 slides into the space between the ridges 123, 125 to form the dovetail joint 129 as shown, for example, in FIG. 5F. The angled grooves 131 forming the mortise portion of the dovetail joint 129 preferably extend the entire length of the blade support 117. The angled portions 133 forming the tenon of the dovetail joint 129 preferably extend a distance along the blade 119, parallel to its longitudinal axis, which is substantially equal to the length of the blade support 117. The cutting edge 134 does not intersect the angled portions 133 of the blade 119.

The angled portions 133 of the blade 119 form notches 135 in the blade 119. These notches 135 preferably abut against the die-facing end 137 of the blade support 117 thereby preventing longitudinal movement of the blade 119 relative to the blade support 117 in a direction from the abutting die-facing end 137 of the blade support 117 to the other or chain-facing end 139.

To prevent longitudinal movement of the blade 119 relative to the blade support 117 in both directions, preferably at least one non-cutting edge such as edge 140 contains at least one notch for receiving a pin. Most preferably the front or leading non-cutting edge 140 of the blade 119 contains a lateral notch 141 for receiving a laterally directed pin 142 as shown, for example, in FIG. 5D. The pin 142 extends through a washer 143 and then through leading ridge 123 into the lateral notch 141. The pin 142 may be integral with or separate from the washer 143, but in either case should be firmly held by the washer 143 so that it does not fall out during the cutting operation.

The pin 142 is preferably in the form of a hollow cylinder having a slit along its length so that it may be compressed and forced through the holes in the washer 143 and leading ridge 123. The pin 142 may also be in the form of a wedge, key, or the like which is fitted or driven into the openings in the washer 143 and leading ridge 123 so as to extend into the lateral notch 141 of the blade 119. Preferably, the fit should be such that upon separating the washer 143 from the support block 117, the pin 142 is removed from the lateral notch 141 and leading ridge 123 while still be securely held by the washer 143.

The washer 143 is secured to the support block 117 by means of a bolt 144 which passes through the washer 143 and into bores 145, 146 in the support block 117, as shown in FIG. 5E. The bolt 144 may be secured to the support block 117 via internal threads in bore 146 of the support block. In an alternative embodiment, the bolt 144 may extend beyond the bore 146 and be secured by a nut (not shown).

The support block 117 is preferably split in its longitudinal direction so as to obtain leg-like portions 147, 148 as shown in the top view of FIG. 5E. The split is preferably in the form of a channel 149 which extends from one end 137 of the blade support 117 to a circular cavity 150 which is about centrally located in the blade support 117. The circular cavity 150 shown in FIGS. 5A, 5D, 5E, and 5G extends from the bottom 121 to the top 151 of the blade support 117. The central split in the blade support 117 permits lateral movement of the legs 147, 148 upon tightening of the bolt 144 to thereby apply a clamping force to the angled portions 133 of the blade 119. The compressive force applied by the ridge portions 123, 125 to the blade 119 as a result of tightening the bolt 144 prevents lateral and vertical movement as well as longitudinal movement of the blade 119 relative to the blade support 117.

As shown in FIG. 5F and 5G, the blade support 117 and bolt assembly 120 bottom-most surfaces are preferably flush with the bottom-most surface of the long blade 119 when the blade 119 is secured in the support 117. In this preferred embodiment, the, blade support 117 and blade 119 when assembled, provide a flat surface for contact with and guidance by lower chain supports such as supports 75' shown in FIG. 6C. However, the channels or grooves 78' in the lower chain guide 75' shown in FIGS. 5C and 6C would not be needed because of the flat or flush assembly of the pieces. The top surface of the blade 119 is preferably essentially flat so that the cutting edge 134 cuts the extrudate essentially at the die orifice to avoid entrapment it or smearing of the extrudate between the blade top surface and the die.

The blade support 117 may be attached to the chain 20' by means of an L-shaped blade support connector similar to connector 23' shown in FIGS. 5C and 6C. The horizontal or bottom portion of the connector may be attached to the top 151 of the blade support 117 by means of a bolt as exemplified in FIGS. 5C and 6C. The bolt may be received in a vertically oriented threaded bore 153 shown in FIG. 5E, 5F, and 5G.

As shown in FIGS. 5E, 5F, and 5G, the blade support 117 preferably has raised portions or step-like elements 155, 156 on its top surface 151 which form a channel 158 for receiving an L-shaped blade support connector. The step-like elements 155, 156 reduce or prevent lateral movement of the blade support 117 and blade 119 relative to the blade support connector.

The blade support 117 shown in FIGS. 5D through 5G may be used to support the preferred short blade 160 shown in FIGS. 5H through 5M. Preferably, the blade support 117 and blade 160 when assembled, provide a flat surface for contact with and guidance by lower chain supports such as lower chain supports 75' shown in FIG. 6C. Also, the blade surface which faces the die 8, 10 is preferably essentially flat at least in the portion of the blade 160 which passes over the die orifice so that the cutting edge 174 partially cuts the extrudate essentially at the die orifice. The flat upper or die-facing surface avoids entrapment or smearing of the extrudate between the die facing surface of the blade 160 and the die 8, 10.

Figure 5P:
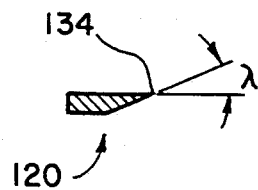
FIG. 5P is a cross-sectional view taken along line 5P—5P of FIG. 5E.
Figure 5H:
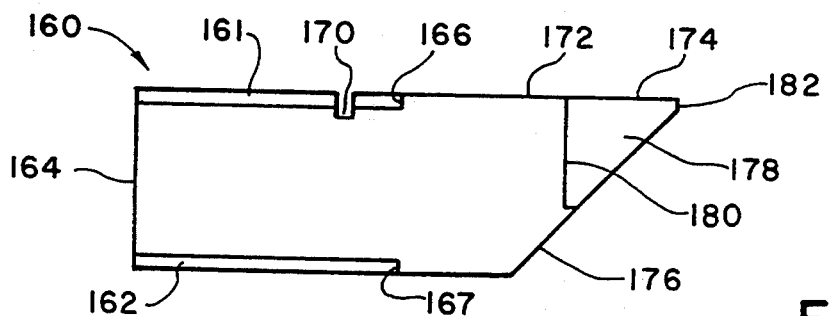
FIG. 5H is a bottom view of a preferred short blade for partial cutting of the extrudates which may be secured in the preferred blade support of FIGS. 5D through 5G.
Figure 5N:
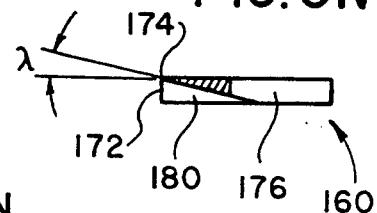
FIG. 5N is a cross-sectional view taken along line 5N—5N of FIG. 5I.
Figure 5I:
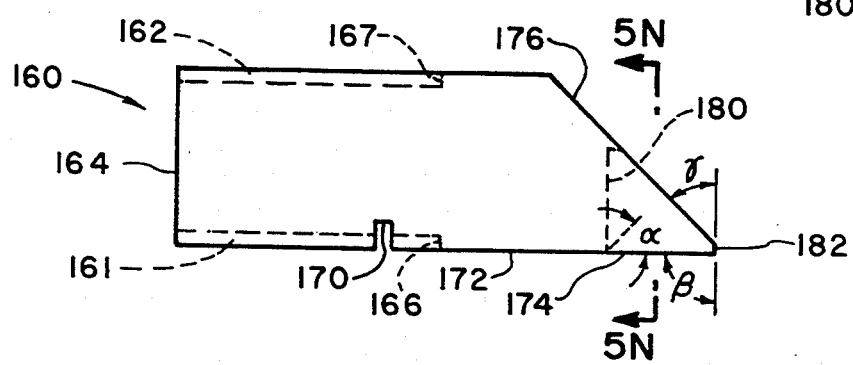
FIG. 5I is a top view of the preferred short blade of FIG. 5H.
Figure 5J:
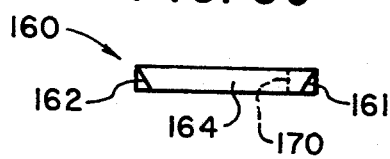
FIG. 5J is a left side view of the preferred short blade of FIG. 5H.

The short blade 160, as shown for example in FIGS. 5H, 5I, and 5J, has angled portions 161, 162 forming the tenon of the dovetail joint formed by the short blade 160 and the ridges 123, 125 of the blade support 117. The angled portions 161, 162 preferably extend from the non-cutting end 164 a distance along the short blade which is substantially equal to the length of the blade support 117. The angled portions 161, 162 of the short blade form notches 166, 167 in the short blade 160. These notches 166, 167 like the notches 135 of the long blade 119, preferably abut against the die-facing end 137 of the blade support 117 to prevent longitudinal movement of the blade 160 relative to the blade support 117 in a direction from the abutting end or die-facing end 137 of the blade support 117 to the other or chain facing end 139 of the blade support 117.

The short blade 160, like the long blade 119, preferably contains at least one notch in at least one non-cutting edge 172, 176 for receiving a pin or key. Short blade 160 most preferably has a lateral notch 170 in its front or leading non-cutting edge 172 as shown in FIGS. 5H, 5I, 5K, and 5M. The lateral notch 170 is for receiving a laterally directed pin 142 or other means for preventing longitudinal movement of the blade 160 relative to the blade support 117 in both directions.

The angle $\alpha$ formed by the cutting edge 134 and the front or leading non-cutting edge 140 of the long blade 119 as shown in FIG. 5E may range from about 0° to about 60°, preferably from about 20° to about 30°. The angle of the cutting edge 134 in relation to the direction of movement of the long blade 119 across the die orifices 8 (not shown) is shown as angle $\beta$ in FIG. 5E. The angle $\beta$ is the complement (90° minus $\alpha$) of the angle $\alpha$.

As shown in FIG. 5I, the angle $\alpha$ formed by the cutting edge 174 and the adjoining front or leading non-cutting edge 172 of the short blade 160 is 0°. Thus, the cutting edge 174 and the non-cutting leading edge 172 are in a straight line. The angle $\beta$ it formed by the cutting edge 174 and the direction of movement of the short blade 160 across the die orifice 8 (not shown) is about 90° as shown in FIG. 5I. The angle gamma ($\gamma$) formed between the trig edge 176 of the short blade 160 and the direction of travel of the short blade 160 may be about 45° and may range from about 0° to, about 60°, preferably about 35° to about 50°, when the angle a is 0°. However, the angle $\alpha$ for the short blade 160 may also range up to about 60°. Increasing the angle $\alpha$ results in a more gradual cutting of the extrudate.

Figure 5L:
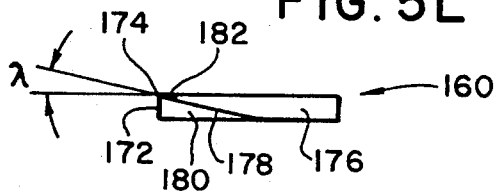
FIG. 5L is an enlarged right side view of the preferred short blade of FIG. 5H.
Figure 5K:
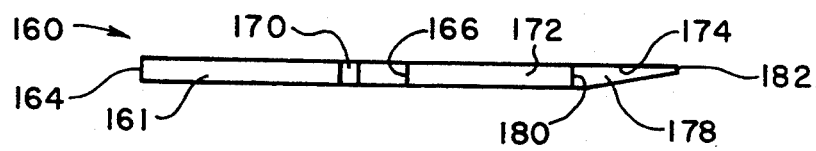
FIG. 5K is a front view of the preferred short blade of FIG. 5H.
Figure 5M:
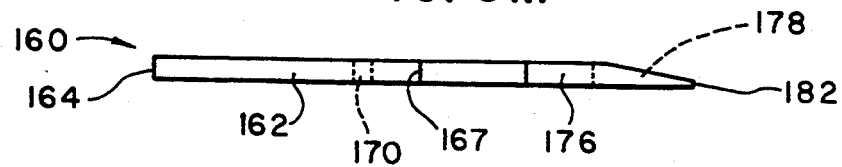
FIG. 5M is a rear view of the preferred short blade of FIG. 5H.

As shown in FIGS. 5H, 5I, and 5K, the cutting edge 174 of the short blade 160 is relatively small compared to the length of the blade. Minimizing the length of the cutting edge 174 is preferred because it tends to reduce vertical wobbling of the short blade 160. The length of the cutting edge 174 may, for example, be from about 1 up to about 5 times, preferably about 1.5 to about 3 times, the depth-of-cut in the extrudate. Increasing the length of the cutting edge 174 allows for a greater number of blade sharpenings.

The maximum thickness of the cutting portion 178 of the short blade 160 is limited by the degree of spread desired between the legs or protrusions formed in the extrudate. If the section of cutting portion 178 which passes through the extrudate is too thick, the legs may be caused to spread excessively. However, as the thickness of the cutting portion 178 is reduced, wobbling of the blade tends to increase. Therefore, in the preferred embodiments of the present invention, the cutting portion 178 of the short blade 160 is made small and thin while keeping a thicker portion for the remaining or non-cutting pan of the blade. Maintaining a large, thick non-cutting portion of the blade helps to strengthen it and reduce vertical wobbling.

The degree of spreading of the legs or protrusions may be reduced by reducing the cutting angle lambda ($\lambda$) of the short blade 160. It is preferably substantially less than the cutting angle lambda ($\lambda$) of the long blade 119. For example, the ratio of the cutting angle lambda ($\lambda$) of the short blade 160 to the cutting angle lambda ($\lambda$) of the long blade 119 may range from about 0.4:1 to about 0.6:1.

The cutting angle lambda ($\lambda$) for the short blade 160 as shown in FIG. 5L and 5N, is preferably less than about 15°, most preferably about 10° or less. The cutting angle lambda ($\lambda$) is measured in a plane 5N—5N which is perpendicular to the cutting edge 174 as indicated in FIG. 5I. The cutting angle lambda ($\lambda$) of the long blade 119 may be substantially larger than that of the short blade 110. The cutting angle lambda ($\lambda$) of the long blade 119, as shown in FIG. 5P, is preferably less than about 30°, most preferably about 20° or less. The cutting angle lambda (λ) of the long blade is measured in a plane 5P—5P which is perpendicular to the cutting edge 134, as indicated in FIG. 5E.

The difference in thickness between the cutting portion 178 and the non-cutting portion of the short blade 160 results in a ridge or cliff-like portion 180 extending from the junction of the front edge 172 and cutting edge 174 at least substantially to the back or trailing edge 176 of the blade 160. This ledge or ridge 180 is shown in FIGS. 5H, 5I, 5L, and 5N. It extends in the direction of movement of the blade 160.

The short blade 160 preferably has a snub-nosed point or land 182 at the end of its cutting edge 174 and adjoining trailing edge 176 as shown in FIGS. 5H, 5I, and 5L. Avoidance of a sharp point by use of the land 182 avoids the danger of a sharp point breaking off and contaminating the food product. To further assure against blade breakage and wobbling, the blades are preferably made of air-hardened stainless steel.

The blade supports 117, and long blades 119 shown in FIGS. 5D through 5G and the short blade 160 shown in FIGS. 5H through 5N are right-handed for use on the downstream chain 20' shown in FIG. 5C. Left-handed blade supports and left-handed short and long blades may be used for the upstream chain 22'. The left-handed blades and supports would be mirror images of the right-handed blades 119, 160 and supports 117.

Continuous Chain Or Band Cutter Operation

In the embodiments shown in FIGS. 1 through 8, the downstream short blades, such as blade 12a attached to downstream chain 20, pass over only a portion of each of the orifices of the downstream row of dies 8. The upstream short blades, such as blade 12b attached to upstream chain 22, pass over only a portion of each of the orifices of the upstream row of dies 10. Likewise, the downstream long blades, such as blade 16a attached to downstream chain 20, pass over the entire orifice of only the downstream dies 8. The upstream long blades, such as blade 16b, likewise pass over the entire orifices of only the upstream dies 10. In an alternative embodiment, the downstream long blades 16a and the upstream long blades 16b may be replaced by single long blades which connect the downstream chain 20 to the upstream chain 22. In this embodiment, each of the long blades would pass over the entire orifices of both the downstream row of dies 8 and the upstream row of dies 10.

Figure 8:
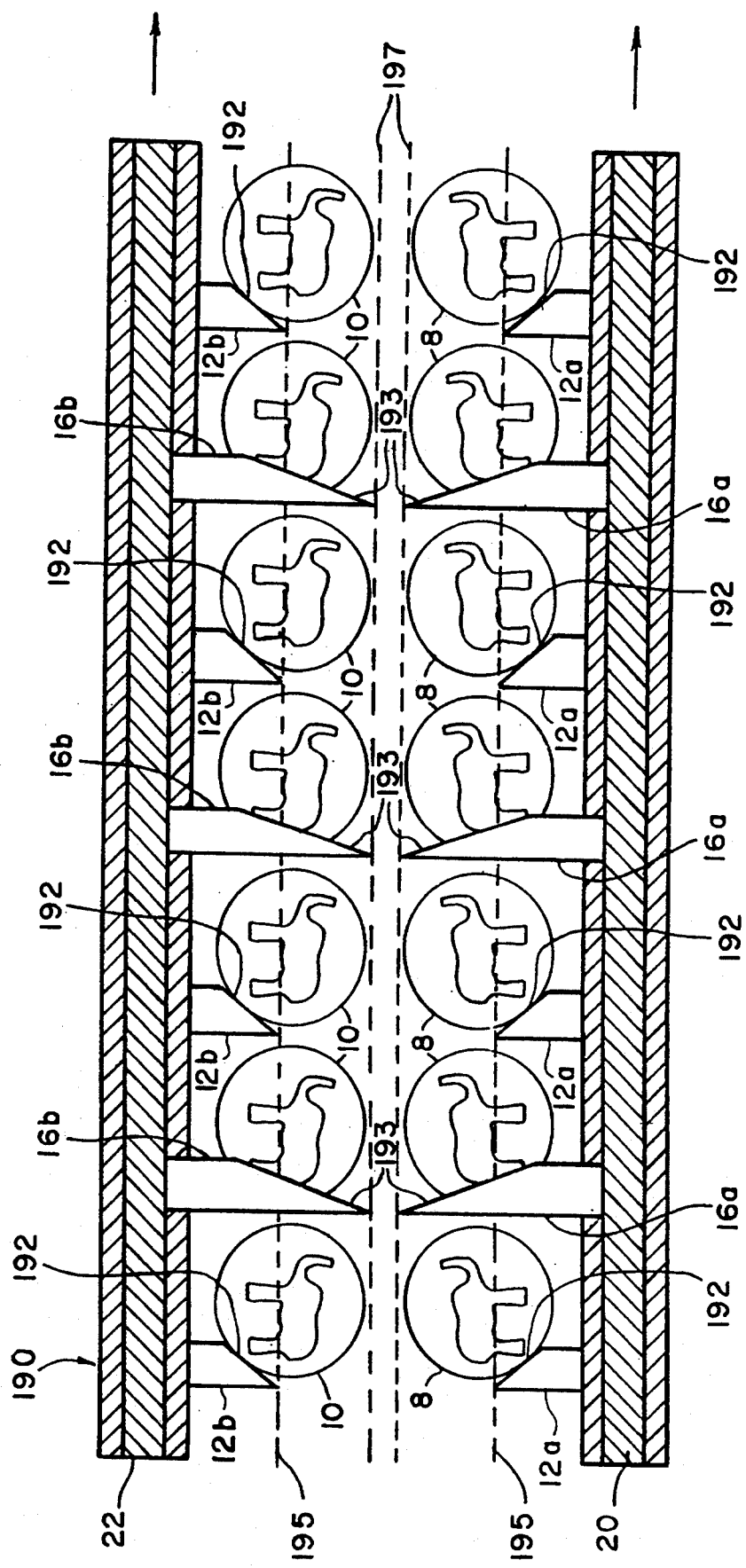
FIG. 8 is a schematic diagram showing the operation of a continuous or endless band or chain cutter embodiment of the present invention.

FIG. 8 is a schematic bottom view of a continuous chain or band cutter 190 showing a blade arrangement for producing three-dimensional elephants. The continuous chain or band cutter 190 both partially and completely cuts the extrudates from two rows of dies 8 and 10. Both the downstream dies 8 and the upstream dies 10 have orifices in the shape of a side view of an elephant. The continuous chain or band cutter 190 comprises downstream chain or band 20 and upstream chain or band 22. Single-edged downstream short blades 12a and long blades 16a are mounted in alternating positions on downstream chain or band 20. Single-edged upstream short blades 12b and long blades 16b are mounted on alternating positions on upstream chain or band 22. The chains or bands 20, 22 and blades 12a, 12b, 16a, 16b are driven in a straight path across the die orifices as shown by the arrows in FIG. 8.

The blades 12a, 12b, 16a, and 16b are positioned on the chains or bands 20, 22 so that: a) downstream short blades 12a simultaneously partially cut the extrudate ropes extruded from downstream dies 8, b) upstream short blades 12b simultaneously partially cut the extrudate ropes from upstream dies 10, c) downstream long blades 16a simultaneously completely cut the partially cut extrudate ropes extruded from downstream dies 8 to obtain a row of three-dimensional dough pieces, and d) upstream long blades 16b simultaneously cut the partially cut extrudate ropes extruded from upstream dies 10 to obtain another row of three-dimensional dough or confectionery pieces. The partial cuts and the complete cuts are all made in the same direction by cutting edges 192 and 193, respectively.

The path traveled by the tips or ends of short blades 12a, 12b is shown by the dotted lines 195 for each row of dies 8, 10. The short blades 12a, 12b partially cut each of the extrudates so as to form two individual legs on one side of the elephant-shaped extrudate without completely severing the extrudate as it continues to exit the die.

The path traveled by the tips or ends of the long blades 16a, 16b is shown by the dotted lines 197 for each row of dies 8, 10. The long blades 16a, 16b completely cut or sever the elephant-shaped extrudates which were partially cut by the short blades 12a, 12b. Complete severance by the long blades 16a, 16b forms two additional individual legs on the other side of the extrudate to obtain a three-dimensional elephant-shaped piece having four individual legs.

Reciprocating Or Oscillating Cutter

In other embodiments of the present invention, the blades which perform the partial cutting and the blades which perform the complete cutting of the extrudates move in a generally rectangular path in a plane which is generally parallel to the die plate 6. In these embodiments, the cutter reciprocates or oscillates so that the partial cutting and the complete cutting of the extrudate ropes is performed in opposite cutting direction. The blades which perform the partial cut and the blades which perform the complete cut may be the same or different. When the partial cutting and the complete cutting blades are the same, the blades have two opposing cutting edges. Embodiments of the oscillating or reciprocating cutter may be used to partially cut and to completely cut extrudates from a single row of dies or a plurality of rows of dies.

Figure 9:
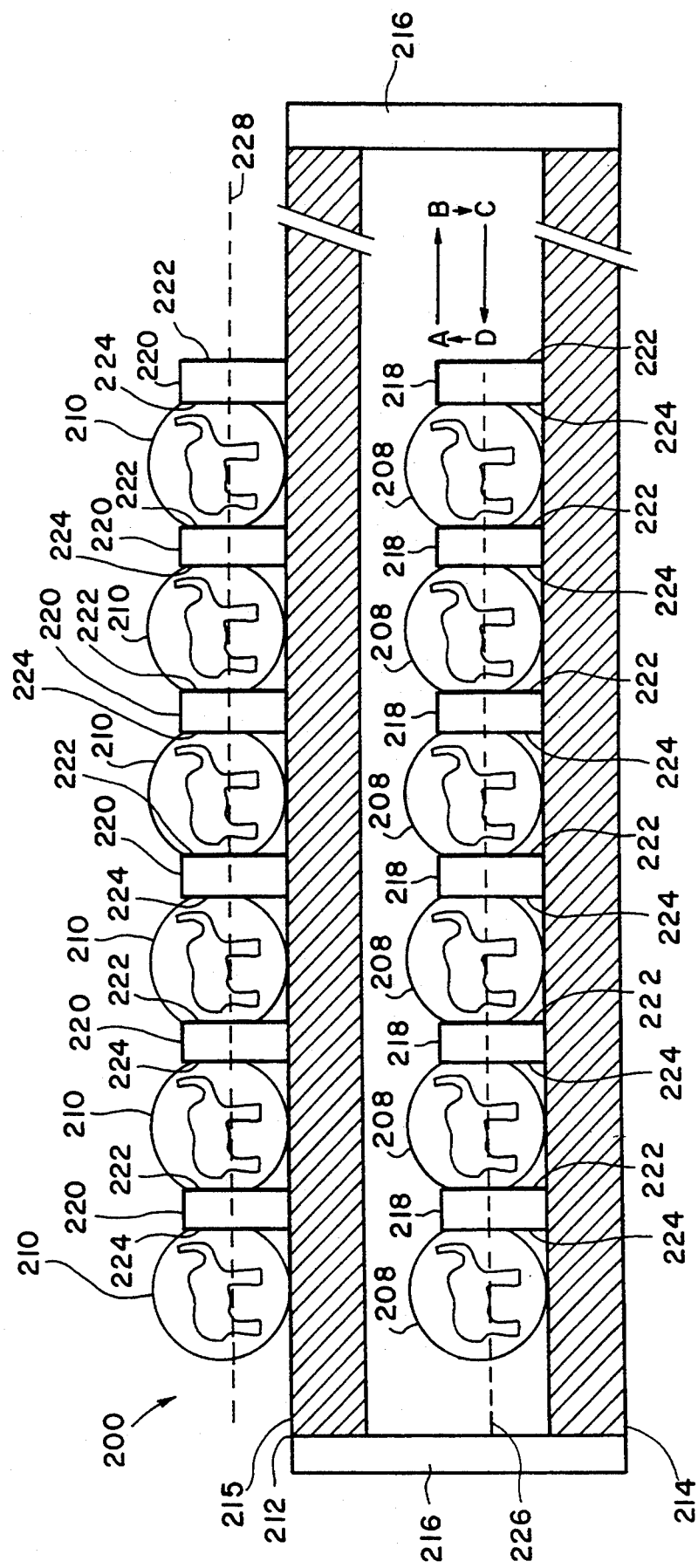
FIG. 9 is a schematic diagram showing the operation of an oscillating or reciprocating cutter embodiment of the present invention having double-edged blades.

In the embodiment schematically shown from the bottom in FIG. 9 the reciprocating or oscillating cutter 200 both partially and completely cuts the extrudates from two rows of dies 208 and 210. Both the downstream dies 208 and upstream dies 210 have orifices in the shape of a side view of an elephant. The reciprocating cutter 200 comprises blade support frame 212. The blade support frame 212 is generally rectangular in shape and comprises two generally parallel longitudinal members 214 and 215 which are connected by side members 216 at their ends. Double-edged downstream blades 218 and double-edged upstream blades 220 are mounted upon downstream longitudinal member 214 and upstream longitudinal member 215, respectively.

The frame 212 and the blades 218, 220 are driven in a generally rectangular path as illustrated by the arrows A to B, B to C, C to D, and D to A in FIG. 9. In stroke A to B, for example, the frame 212 and blades 218, 220 are moved so that: a) downstream blades 218 pass across the entire orifices of downstream dies 208, and b) upstream blades 220 pass across the entire orifices of upstream dies 210 to completely cut each of the elephant-shaped extrudate ropes. Each of the blades 218, 220 may pass across a single die 208, 210, respectively, or a plurality of dies 208, 210, respectively. Preferably, each blade moves across only one die. During cutting stroke A to B cutting edge 222 completely cuts the extrudate ropes into individual pieces. At startup, this stroke serves to remove extrudate from the dies to obtain a steady flow. When a steady flow is obtained, stroke A to B serves to cut the partially cut extrudates from a previous cycle into individual elephant-shaped pieces having four individual legs.

In FIG. 9, the blades 218, 220 are shown at the end of stroke A to B and the beginning of stroke B to C. During stroke B to C, the frame 212 and the blades 218, 220 are simultaneously moved downstream into position for partial cutting of the extrudate ropes. During stroke B to C, the blades 218, 220 are located between the orifices of the dies 208, 210, respectively so that the extrudates are not cut.

During stroke C to D, each of the extrudates is partially cut so as to form two individual legs on one side of the elephant-shaped extrudate without completely severing the extrudate as it continues to exit the die. The partial cutting during stroke C to D is performed by cutting edges 224. The path traveled by the tops or ends of downstream blades 218 during stroke C to D is shown by the dotted line 226. The path traveled by the tops or ends of the upstream blades 220 during stroke C to D is shown by dotted[line 228.

At the end of stroke C to D and the beginning of stroke D to A, the blades 218 and 220 are located between successive die orifices in a given row of dies. During stroke D to A, the frame 212 and blades 218, 220 are moved upstream back to their position at the start of stroke A to B without cutting the extrudates. Stroke A to B then completely severs the elephant-shaped extrudate which was partially cut in the previous stroke C to D. Complete severance during stroke A to B forms two additional individual legs on the other side of the extrudate to obtain a three-dimensional four legged elephant-shaped piece.

The simultaneous cutting of extrudates from more than two rows of dies can be achieved by constructing a blade support frame with three or more longitudinal members which are connected at their ends by side members. The number of longitudinal members would equal the number of rows of dies. Each of the longitudinal members would carry double-edged blades for partial cutting and complete cutting of the extrudates.

Figure 10:
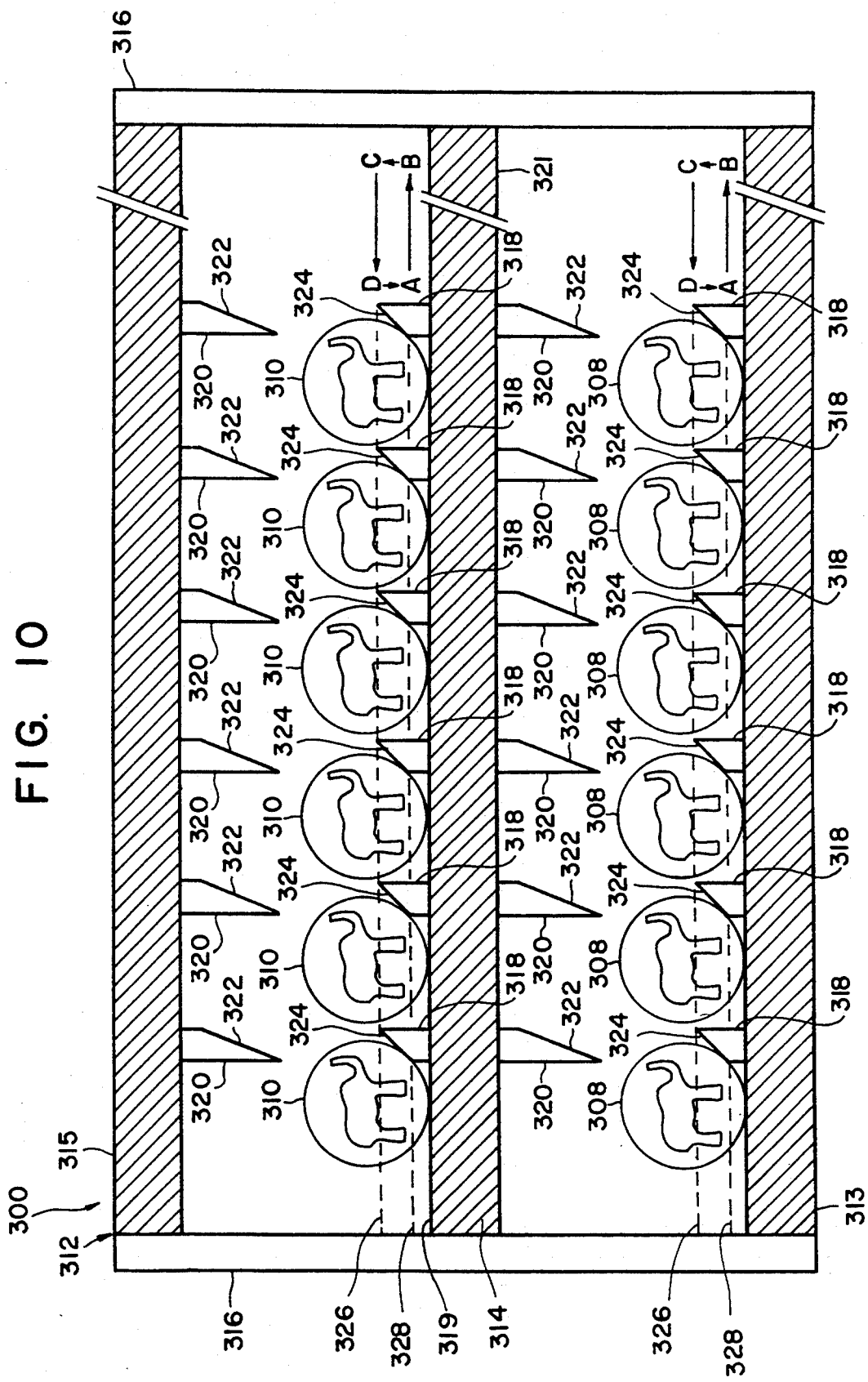
FIG. 10 is a schematic diagram showing the operation of an oscillating or reciprocating cutter embodiment of the present invention having single-edged blades.

In the oscillating cutter embodiment schematically shown from the bottom in FIG. 10, the blades which perform the partial cut and the blades which perform the complete cut are different blades. The reciprocating cutter 300 both partially and completely cuts the extrudates from two rows of dies 308, and 310. Both the downstream dies 308 and upstream dies 310 have orifices in the shape of a side view of an elephant. The reciprocating cutter 300 comprises blade support frame 312. The blade support frame 312 is generally rectangular in shape and comprises three generally parallel longitudinal members 313, 314, and 315 which are connected by side members 316 at their ends. For a given row of dies 308 or 310, the single-edged short blades 318 are mounted upon a different longitudinal member than the single-edged long blades 320. Single-edged short blades 318 are mounted upon the downstream longitudinal member 313 and the upstream side 319 of the central longitudinal member 314. Single-edged long blades 320 are mounted on upstream longitudinal member 315 and on the downstream side 321 of central longitudinal member 314.

The frame 312 and the blades 318, 320 are driven in a generally rectangular path as illustrated by the arrows A to B, B to C, C to D, and D to A in FIG. 10. In stroke A to B, for example, the frame 312 and blades 318, 320 are moved so that: a) long blades 320 which are attached to central longitudinal member 314 pass across the entire orifices of downstream dies 308, and b) long blades 320 which are attached to upstream longitudinal member 315 pass across the entire orifices of upstream dies 310 to simultaneously completely cut each of the elephant-shaped extrudate ropes. Each of the blades 318, 320 may pass across a single die 308, 310, respectively, or a plurality of dies 308, 310, respectively. Preferably, each blade moves across only one die to reduce cutter speeds for a given mass flow rate of extrudate and given dough piece thickness. During cutting stroke A to B cutting edge 322 completely cuts or severs the extrudate ropes. The blades 318, 320 are shown at the end of stroke B to C and the beginning of stroke C to D.

During stroke B to C, the frame 312 and the blades 318, 320 are simultaneously moved upstream into position for partial cutting of the extrudate ropes. During stroke B to C, the blades 318, 320 are located between the orifices of the dies 308, 310, respectively so that the extrudates are not cut.

During stroke C to D each of the extrudates is partially cut so as to form two individual legs on one side of the elephant-shaped extrudate without completely severing the extrudate as it continues to exit the die. The partial cutting during stroke C to D is performed by cutting edges 324. The path traveled by the tips or ends of short blades 318 during stroke C to D is shown by the dotted lines 326 for each row of dies 308, 310. The path traveled by the tips or ends of the long blades 320 during stroke A to B is shown by dotted lines 328 for each row of dies 308, 310.

At the end of stroke C to D and the beginning of stroke D to A, the blades 318 and 320 are located between successive die orifices in a given row of dies. During stroke D to A, the frame 312 and blades 318, 320 are simultaneously moved downstream back to their position at the start of stroke A to B without cutting the extrudates. Stroke A to B then completely severs the elephant-shaped extrudate which was partially cut in the previous stroke C to D. Complete severance during stroke A to B forms two additional individual legs on the other side of the extrudate to obtain a three-dimensional elephant-shaped piece having four individual legs.

The simultaneous cutting of more than two rows of dies can be achieved by constructing a blade support frame with two end longitudinal members and two or more intermediate or central longitudinal members which are connected at their ends by side members. The number of longitudinal members would equal the number of rows of dies plus one. One of the end longitudinal members can carry single-edged short blades for partial cutting. The other end longitudinal member can carry single-edged blades for complete cutting of the extrudates. The intermediate or central longitudinal members may carry long blades on one side and short blades on their other side so that for each row of dies, there is a row of short blades for partial cutting and a row of long blades for complete cutting of the extrudates.

Rotating Cutter

Figure 11:
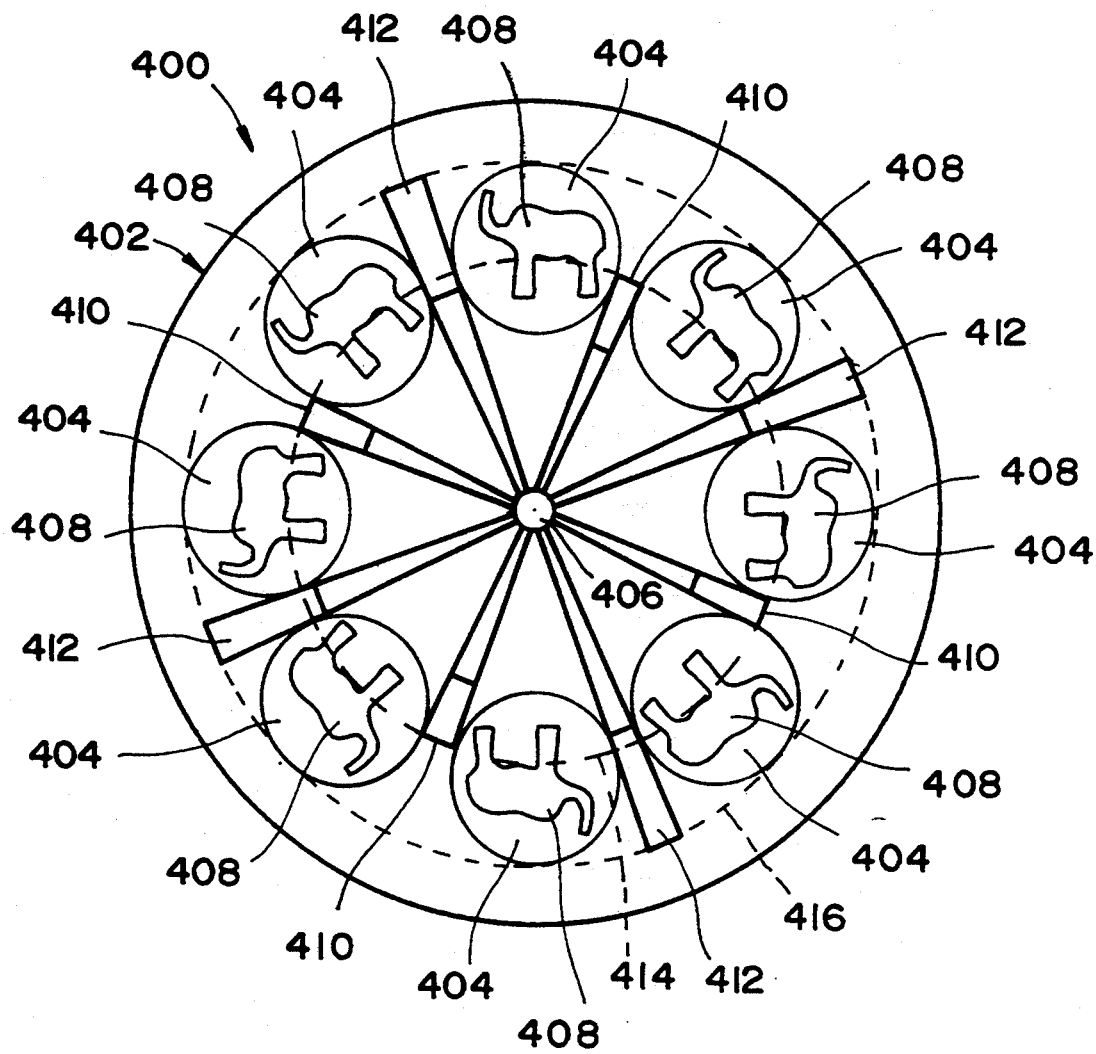
FIG. 11 is a front view of a multi-orifice rotating cutter embodiment of the present invention.

In other embodiments of the present invention, a cutter which rotates in a circular direction may be used to partially cut and completely cut the extrudates from a plurality of die orifices as shown in FIG. 11. The multi-orifice rotating cutter 400 shown in FIG. 11 comprises a multi-orifice extruder 402 which feeds a dough to a plurality of dies 404. The dies 404 are disposed in a circle about a rotating shaft 406. In the embodiment shown in FIG. 11, each of the dies has an orifice 408 in the shape of the side view of an elephant. Short blades 410 for partial cutting of the extrudates and long blades 412 for complete cutting or severing of the extrudates are mounted upon the rotating shaft 406. The short blades 410 alternate positions with the long blades 412 about the centrally located rotating shaft 406. The die orifices 408 and the cutting edges of each of the blades 410, 412 are preferably equally spaced circumferentially so that the legs on one side of the three-dimensional dough pieces have a thickness which is at least substantially the same as the thickness of the legs on the other side of the dough pieces.

In the embodiment shown in FIG. 11, the number of short blades 410 and the number of long blades 4 12 are each equal to the number of dies 404. However, the number of short blades 410 and the number of long blades 412 may each be less than or greater than 1 per die 404. The greater the ratio of blades per die, the slower the rotational speed of the rotating shaft 406 and the rotating blades 410, 412 need to be for a given mass flow rate and given thickness of the extrudates. Slower rotating speeds are preferred so as to reduce scattering of the three-dimensional dough pieces as they are severed from the remaining dough mass. The ratio of either short blades 410 or long blades 412 per die may, for example, be from 1:1 to 1:10. A preferred ratio of short blades 410 to dies 404 is 1:1 to 3:1 for cracker doughs. Likewise, a preferred ratio of long blades 412 to dies 404 is 1:1 to 3:1 for cracker doughs.

The rotating shaft 406 and the rotating blades 410, 412 which are fixedly attached to the shaft 406 may be driven by a motor different from the motor (not shown) which is used to drive the extruder screws which feed the dough through orifices 408. An independent drive for the rotating shaft 406 and the attached blades 410, 412 is preferred.

The circular path traveled by the ends of the short blades 410 is shown by the dotted line 414. The circular path traveled by the ends of the long blades 412 is shown by dotted line 416. The short blades 410 travel across only a portion of the orifices 408 to only partially cut the extrudates as they exit the dies 404. The partial cutting by the short blades 410 form two individual legs on one side of the elephant-shaped extrudate without completely severing the extrudate as it continues to exit the die 404. The next or successive blade to pass across the orifice 408 is a long blade 412. The long blade 412 passes across the entire periphery of the orifice 408 to completely cut or sever the elephant-shaped extrudate which was partially cut by the short blade 410. Complete severance of the extrudate by the long blades 412, forms two additional individual legs on the other side of the extrudate to obtain a three-dimensional elephant-shaped piece having four individual legs.

Three-Dimensional

Figure 12:
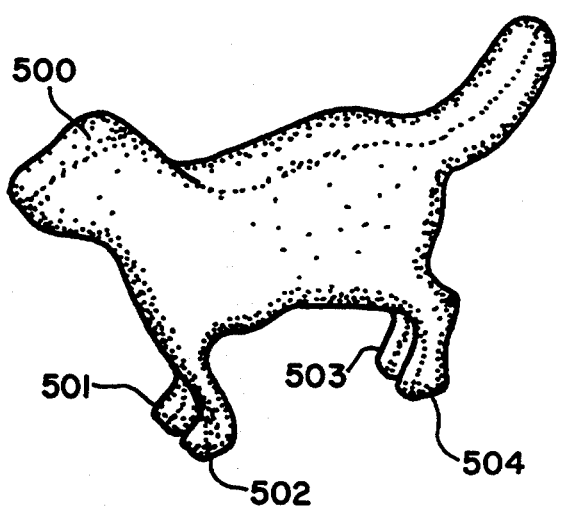
FIG. 12 is a perspective view of a cracker in the shape of a dog having four individual legs produced in accordance with the present invention.
Figure 13:
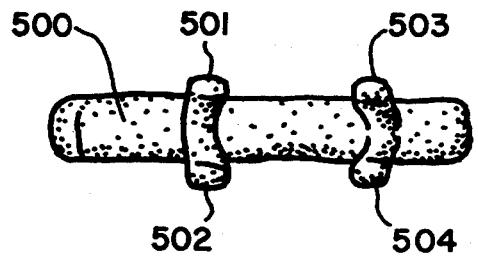
FIG. 13 is a bottom view of the cracker of FIG. 12.

An example of a three-dimensional cracker in the shape of a dog having four individual legs which may be produced in accordance with the present invention is shown in perspective in FIG. 12. The three-dimensional cracker 500 may be produced by baking a leavenable three-dimensional dough piece produced using the apparatus of FIGS. 1-11. The cracker 500, as shown in FIGS. 12 and 13 has two individual, separated front legs 501, 502 and two individual, separated rear legs 503, 504. FIG. 13 is a bottom view of the cracker of FIG. 12 showing the distinct separation of the side legs 501 and 503 from the other side legs 502 and 504. Separation of the side legs 501 and 503 from side legs 502 and 504 is accomplished by the partial cutting of the extrudate as it leaves the die. Separation of the front legs 501 and 502 from the rear legs 503 and 504 is a result of the shape of the die orifice.

Figure 14:
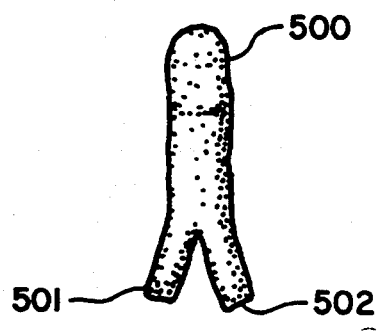
FIG. 14 is a front view of the cracker of FIG. 12.

FIG. 14 is a front view of the cracker of FIG. 12 showing separation of the two front legs 501 and 502. The degree of separation of the individual legs in the three-dimensional dough piece is less than the degree of separation in the baked product shown in FIG. 14. The subsequent baking of the three-dimensional dough piece in, for example, a band oven or fluidized bed oven leavens the dough and further separates the individual legs 501 and 503 on one side of the dough piece from the individual legs 502, 504 on the other side of the dough piece.

Figure 15:
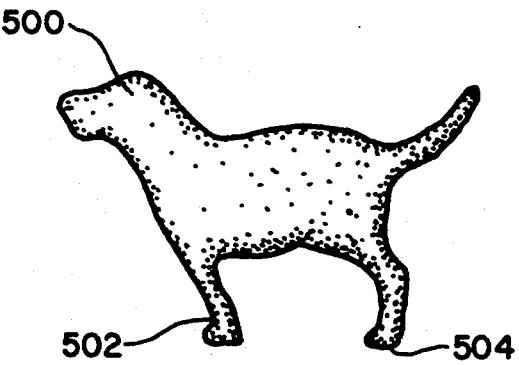
FIG. 15 is a side view of the cracker of FIG. 12.

FIG. 15 is a side view of the cracker 500 of FIG. 12. The shape of the cracker shown in FIG. 15 is generally the shape of the die orifice from which the three-dimensional dough piece is produced. The separation of individual leg 502 from individual leg 504 shown in FIG. 15 is a result of the shape of the die orifice.

Formulations And Processing

Conventional formulations and extruder processing conditions may be used in the production of three-dimensional crackers, cookies, expandable or puffable glassy matrix half-products, pasta, fully expanded or puffed snacks, ready-to-eat cereals, confections such as chewing gum, and pet foods, such as canine or feline biscuits.

The crackers of the present invention may be of the fermented type as well as of the unfermented or chemically leavened type. However, in the production of crackers by extruding a raw dough and cutting it into three dimensional dough pieces for subsequent baking and leavening it has been found that the high pressures used to extrude the uncooked dough through the dies tends to adversely affect the shaping of the dough pieces and their baking characteristics.

It is believed that the high pressure exerted upon the cracker dough upon extrusion from the dies changes the distribution, size, or shape of air cells in the dough in a manner which may adversely affect the baking characteristics of the dough. In the production of three dimensional crackers from extruded three-dimensional dough pieces it is preferred to control dough viscosity and elasticity to provide high dough shapeability and definition upon extrusion, as well as proper baking characteristics after extrusion. Proper baking characteristics include leavening of the dough while retaining high shape definition, and a tender texture in the final baked good.

The extrudable cracker doughs of the present invention preferably contain an enzyme composition for controlling dough viscosity or consistency for shaping, expansion, and achievement of a tender texture. The enzyme composition comprises proteolytic enzymes, which may be in combination with an amylase. It is believed that the proteolytic enzymes weaken the gluten network which results in a more pliable, extensible dough. This improves extrudability and cultability and aids expansion upon baking of the shaped dough pieces. The proteolytic enzyme also improves tenderness of the baked product. The amylase is believed to partially hydrolyze the starch prior to baking causing a reduced degree of gelatinization of starch which tends to improve the texture of the baked products. In addition, the amylase reduces the viscosity of the dough, which improves extrudability.

Starch gelatinization occurs when: a) water in a sufficient amount, generally at least about 30% by weight, based upon the weight of the starch, is added to and mixed with starch and, b) the temperature of the starch is raised to at least about 60° C. (140° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in properties such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al., "The Terminology And Methodology Associated With Basic Starch Phenomenon," *Cereal Foods World*, Vol. 33, No. 3, Pgs. 306-311 (March 1988). In the production of crackers in accordance with the present invention, excessive starch gelatinization is avoided to obtain a long lasting, tender, non-brittle texture in mass produced three-dimensional crackers. The shelf-stable texture lasts for at least about two months, preferably at least about six months when the products are packaged in closed containers.

The amount of enzyme used will depend upon the enzyme concentration, and activity of the enzymes. In preferred embodiments of the present invention, the enzyme composition may have a proteolytic activity of from about 365 to 385 Nu/g (Northrop Value). The total mount of enzymes may be from about 9 grams to about 20 grams, preferably from about 11 grams to about 17 grams per hundred pounds of flour. The source of the proteolytic enzymes may be papain or microbial, or mixtures thereof. Papain derived protease is preferred.

The farinaceous materials which may be subjected to the enzymatic treatment in accordance with the present invention include bleached or unbleached flour, flour fractions, and mixtures thereof, starch, such as corn starch, wheat starch, rice starch, potato starch, tapioca starch, and mixtures thereof.

The flour which may be used in the present invention includes wheat, corn, rice, barley, rye, oat, potato, tapioca, graham, and mixtures thereof. The preferred flours for making the baked comestibles of the present invention are wheat flours and mixtures thereof with one or more other flour type, such as oat, rice or barley flour.

The amount of added water may also be used to control dough viscosity and baking characteristics. Generally as the amount of enzyme is increased, the amount of water may be decreased to achieve a desirable dough consistency and baking characteristics. The amount of water may range from about 15% by weight to about 35% by weight, preferably about 17% by weight to about 21% by weight, most preferably from about 18% by weight to about 20% by weight, based upon the total weight of the dough in the production of crackers. The source of the added water may be pure water or a liquid source of water, such as high fructose corn syrup.

The extrudable cracker doughs of the present invention preferably contain at least one emulsifier to reduce cracker hardness and improve texture. Exemplary emulsifiers which may be used are sodium stearyl lactylate, lecithin, glycerol monostearate and other mono-/diglycerides, or mixtures thereof. A preferred emulsifier is sodium stearyl lactylate. Exemplary total amounts of the emulsifier may range from about 0.05% by weight to about 2% by weight, preferably from about 0.1% by weight to about 1.0% by weight, most preferably from about 0.4% by weight to about 0.8% by weight, based upon the total weight of the extrudable cracker dough. The emulsifier promotes cracker tenderness without over expansion.

Leavening agents may be used to promote a tender texture in the three-dimensional crackers or cracker-like products of the present invention. Exemplary leavening agents which may be used are sodium bicarbonate and ammonium bicarbonate, and mixtures thereof. Exemplary mounts of leavening agents range from about 0.1% by weight to about 5% by weight, preferably from about 0.6% by weight to about 2% by weight, based upon the total weight of the dough. Food grade acidic compounds to control pH or effect leavening may also be included in the doughs of the present invention.

Shortening or fat may be included in mounts which enhance cohesiveness of the dough without adversely affecting cracker texture and shape. Exemplary mounts of the shortening or fat or a fat replacement range from 0% to about 16% by weight, preferably from about 2% by weight to about 6% by weight of the dough, not including topping oil. The baked cracker may be sprayed with topping or spray oil in conventional mounts, typically up to about 5% by weight of the cracker.

The shortening or fat which may be used in the preparation of the three-dimensional crackers of the present invention may be those conventionally used in the production of crackers. Exemplary shortening or fats which may be used are vegetable oils, lard, edible fat substitutes or replacements, mixtures thereof, and the like. Vegetable oils are preferred for use in the production of crackers in accordance with the present invention.

One or more sugars may be used in the crackers of the present invention to enhance flavor and browning. Exemplary amounts of the sugar are from about 2% by weight to about 18% by weight of sugar solids, based upon the total weight of the cracker dough. Preferred amounts range from about 2% by weight to about 8% by weight of the dough. The sugars may be monosaccharides, disaccharides or mixtures thereof. The preferred sugars are sucrose, high fructose corn syrup, and mixtures thereof. High fructose corn syrup, as well as other reducing sugars, such as dextrose and lactose, may be used to enhance browning of the cracker.

Exemplary of the flavoring ingredients which may be included in the cracker doughs of the present invention include yeast, yogurt, malt, salt and mixtures thereof. The optional flavoring ingredients may each be included in amounts ranging up to about 8% by weight, preferably from about 0.1% by weight to about 1.5% by weight of the dough. The use of malt is preferred for flavor enhancement, browning, and texturization. Amylytic enzymes in the malt tend to decrease dough viscosity and enhance leavening.

The extrudable cracker doughs of the present invention may be produced by creaming together the flavoring ingredients such as salt and malt with the sugar, lecithin, emulsifier, shortening or fat, and the majority of the water to obtain a substantially homogeneous mixture. The flour and sifted sodium bicarbonate may then be admixed with the creamed mixture. The ammonium bicarbonate may be dissolved in water and then added to the mixture.

The enzymes may be used at temperatures and pH conditions normally recommended by their manufacturers or at conditions which are optimal for proteolytic and amylytic activities. The enzymes may be acidic, neutral, or alkaline.

Enzymes have optimal environments in which they function best. Care should be taken with enzyme treatment to create a suitable environment for the enzyme. The pH of the leavening agents is high so they preferably should not be admixed with the enzyme in a concentrated manner. For example, in producing an unfermented cracker the leavening agent is preferably well dispersed with the other ingredients prior to the addition of the enzyme.

If a plurality of enzymes are used, they preferably are separately added to the mixture rather than being mixed together prior to addition. Separate addition of the enzymes is preferred because it provides better control over the optimal pH and temperatures for a particular enzyme. The enzymes, if supplied in dry form, are preferably first admixed with a small quantity of the water prior to addition. The enzymes are admixed with the remaining ingredients to obtain a substantially homogeneous dough.

Excessive mixing times tend to result in doughs which are too soft and which expand excessively upon extrusion. Mixing times during the creaming stage generally range from about two minutes to about five minutes. The flour and sifted sodium bicarbonate may, for example, be mixed for up to about two minutes prior to the addition of the ammonium bicarbonate and enzymes. The mixing time during the dough-up stage generally ranges from about 5 to 10 minutes, preferably about 6 to 8 minutes. Mixing temperatures may be from about 70° F. to about 120° F., preferably from about 85° F. to about 95° F.

The LFRA values of the cracker doughs of the present invention may range from about 400 grams to about 900 grams for proper extrusion, shaping, and cutting into three-dimensional pieces. LFRA is an acronym for Leatherhead Food Research Association, the manufacturer of a texture analyzer. As used herein, it is the resistance to deformation of the dough to a 0.5" diameter ball probe moving at the constant rate of 2 millimeters per second for a set distance of 15 millimeters into the dough.

The lay time of the dough may be from about zero hours to about eight hours, preferably from about 1½ to about 2 hours. Generally, as the amount of enzyme is increased, the lay time may be reduced. For example, when high amounts of enzymes are used, the lay time may range up to about one-half hour.

The substantially homogeneous cracker dough may then be added to an extruder or to a calendar press comprising counter-rotating rollers which force the dough through dies for cutting into three-dimensional dough pieces in accordance with the present invention.

The extrusion pressure will depend upon the extruder size, number of dies, and the dough consistency. Exemplary extrusion pressures range from about 20 psig to about 500 psig, preferably less than 250 psig. High extrusion pressures tend to result in harder textured crackers. Extrusion temperatures may be from about room temperature or about 75° F. to about 125° F., preferably from about 80° F. to about 110° F.

The extruded, essentially uncooked or raw three-dimensional dough pieces produced in accordance with the present invention may then be transported by conventional conveyor belts to a conventional band oven or jet zone oven for baking into three-dimensional crackers. During baking in the oven, the dough pieces leaven and undergo Maillard browning. The use of a jet zone oven is preferred because it tends to elevate or fluidize the cracker doughs during baking and thereby avoids sticking of the four individual legs. It also facilitates expansion of the product without sticking.

In embodiments of the present invention the cracker dough or other doughs may be produced in situ in an extruder or continuous mixer having a cutter means attached thereto. In other embodiments, the dough may be separately produced in a mixing means such as a continuous mixer, extruder, batch mixer, or combinations thereof. The resulting dough may then be transferred from the mixing means to one or more extruders or one or more pairs of counter-rotating rolls or calendar presses equipped with dies for shaping the dough into extrudates which are cut into three-dimensional dough pieces.

Conventional baking times and temperatures may be used in producing the three-dimensional crackers of the present invention. Exemplary baking times range from about 2 minutes to about 15 minutes. Exemplary baking temperatures range from about 300° F. to about 600° F. The dough pieces may be topped with spray oil, salt, or other conventional toppings before or after baking in known manner.

Compositions for producing glassy matrix three-dimensional half products which are expandable or puffable into three-dimensional puffed products may comprise up to about 100% by weight of at least one flour, from 0% up to about 18% by weight of at least one sugar, from 0% up to about 5% by weight of salt, from 0% up to about 20% by weight of at least one modified starch, and from 0% up to about 10% by weight of one or more flavoring and texturizing ingredients, based upon the total weight of dry ingredients. The amount of water admixed with the dry ingredients is such so as to achieve satisfactory gelatinization of the starch and substantial puffability after cutting. The amount of water may range from about 0.15 to about 1.0 lbs per pound of dry ingredients.

Exemplary glassy half product compositions which may be used in the present invention comprise from about 71% to about 80% by weight rice flour, from about 6.5% to about 7.5% by weight sugar, from about 4.5% to about 15% by weight modified starch, from about 1.6% to about 1.8% by weight salt, from about 1.6% to about 1.8% malt, and from about 4.1% to about 4.5% by weight flavoring, based upon the total weight of dry ingredients. These dry materials may be admixed with water to obtain, for example, a moisture content of about 28% to about 33% by weight, based upon the total weight of the dough composition.

The three-dimensional food products of the present invention may be in the form of vehicles, such as cars or stagecoaches, people, dinosaurs, animals, outer space creatures, insects, and the like. The products may be standable on two, three, four, or more individual extremities on protuberances. For example, a tyrannosaurus product may be standable on two rear legs or on two rear legs plus its tail. An insect product may be made standable on six legs. A car product may be made standable on three or four wheels.

The present invention is further illustrated by the following examples wherein all percentages, ratios, and proportions are by weight, and all temperatures are in F. unless otherwise indicated:

EXAMPLE 1

The ingredients and their relative mounts which may be used to produce a three-dimensional cracker in accordance with the present invention are:

| INGREDIENTS | WEIGHT % |
| --- | --- |
| Flour (wheat, about 12% H$_2$O) | 69.50 |
| Salt | 0.44 |
| Sodium Bicarbonate | 0.44 |
| Ammonium Bicarbonate | 0.35 |
| Malt | 1.00 |
| Sucrose | 2.78 |
| High Fructose Corn Syrup | 1.22 |
| Sodium Stearyl Lactylate | 0.25 |
| Proteolytic Enzyme (Papain) | 0.02 |
| Lecithin | 0.25 |
| Vegetable Oil | 4.98 |
| Water | 18.76 |
| TOTAL | 100.00 |

The proteolytic enzyme may be derived from papain and may exhibit essentially no amylase activity. The proteolytic activity of the enzyme composition may range from about 365 to 385 Nu/g.

An extrudable cracker dough may be produced by creaming together the vegetable oil, lecithin, sodium stearyl lactylate, a majority of the water, the salt, sucrose, high fructose corn syrup, and mail The ingredients may be mixed for about three minutes to obtain a substantially homogeneous creamed mixture. The wheat flour and sifted sodium bicarbonate may then be admixed with the creamed mixture. The mixing may be continued for an additional 30 seconds. The ammonium bicarbonate and the proteolytic enzyme are separately dissolved in the remaining portion of the water and separately added to the other mixed ingredients. The mixing may be continued for about another seven to eight minutes to obtain a substantially homogeneous extrudable cracker dough.

The resulting cracker dough may be permitted to lay up to about 3 hours and then transferred to an extruder and cutting apparatus as shown in FIGS. 1–8. The extrusion may take place at a pressure of about 80 to about 180 psig and a temperature of about 80° F. to about 105° F.

The three-dimensional raw dough pieces may then be transported by means of a conveyor belt and baked by means of a seven zone band oven at temperatures of from about 325° F. to about 525° F. to leaven the three-dimensional dough pieces and obtain three-dimensional crackers.

EXAMPLE 2

The ingredients and their relative amounts which may be used to produce a three-dimensional cracker in accordance with the present invention are:

| INGREDIENTS | WEIGHT % |
| --- | --- |
| Flour (wheat, about 12% H$_2$O) | 67.41 |
| Salt | 0.50 |
| Sodium Bicarbonate | 0.32 |
| Ammonium Bicarbonate | 0.32 |
| Malt | 1.34 |
| Sucrose | 4.46 |
| Sodium Stearyl Lactylate | 0.40 |
| Proteolytic Enzyme (microbial) | 0.01 |
| Proteolytic Enzyme (papain) | 0.01 |
| Lecithin | 0.30 |
| Vegetable Oil | 5.94 |
| Water | 19.00 |
| TOTAL | 100.00 |

The proteolytic enzyme derived from papain may be the same as the proteolytic enzyme used in Example 1. The proteolytic enzyme derived from bacteria may exhibit amylytic activity but is primarily a protease. The activity of the microbial proteolytic enzyme may be from about 365 to 385 Nu/g. The ingredients may be mixed to obtain a cracker dough using the procedure of Example 1. The papain derived proteolytic enzyme and the microbial proteolytic enzyme may be added to separate mounts of water. They may then be separately admixed with the other ingredients after addition of the ammonium bicarbonate as in Example 1 to obtain a substantially homogeneous dough.

The cracker dough may be permitted to lay, then extruded, cut, and baked as in Example 1 to obtain three-dimensional crackers as in Example 1.

EXAMPLES 3–4

The ingredients and their relative amounts which may be used to produce three-dimensional glassy matrix shelf-stable half products which may be subsequently expanded or puffed to obtain crisp, savory, low calorie three-dimensional snacks are:

| DRY INGREDIENTS | Example 3 Weight % | Example 4 Weight % |
| --- | --- | --- |
| Rice Flour | 79.82 | 71.25 |
| Sucrose | 7.25 | 6.46 |
| Salt | 1.82 | 1.62 |
| Malt | 1.82 | 1.62 |
| Nacho Flavor | 4.53 | 4.05 |
| Modified Starch (Baka-snak) | 4.76 | 15.00 |
| TOTAL | 100.00 | 100.00 |

The dry ingredients for Examples 3 and 4 may be fed to a Mapimpianti extruder modified to have a plurality of elephant shaped dies or die inserts and a rotary cutter as shown in FIG. 11 wherein the ratio of short blades to dies is 1:1 and the ratio of long blades to dies is 1:1.

The extruder may contain three chambers or sections. In the first chamber, the dry ingredients may be mixed and preconditioned to a moisture content of about 29% by weight, based upon the total weight of the composition. The composition may then be permitted to flow into the second chamber. This section of the extruder may comprise four temperature zones, heated via electrical barrels. The temperature profile for the four zones may be set to 70° C., 95° C, 115° C, and 120° C., respectively. In the second chamber, the preconditioned material is gelatinized and may be conveyed by what is known as a gelatinization screw, or "G" screw. The cooked composition may then be conveyed into the third chamber. As it enters the third chamber, the cooked composition may be cut into pieces by a small rotary blade. The third chamber may be equipped with paddles for pushing the composition through a forming section and out of the plurality of dies. The third chamber may be equipped with a vacuum for controlling the moisture content of the extrudates to a level which facilitates forming and cutting. In Example 3, the composition may be extruded at a rate of about 141 grams/min. and in Example 4 the rate may be about 137 grams/min. The rotary cutter speed may be set in Examples 3 and 4 so as to obtain three dimensional dough pieces having a weight of about 5.0 to about 5.5 grams per 10 pieces. The three-dimensional dough pieces may then be dried and conditioned at a temperature of about 25° C. and at a relative humidity of about 50% until equilibrium is reached.

The shelf stable three dimensional glassy matrix half products may be puffed and expanded by subjecting them to microwaving on high for about 50 seconds, followed by heating at 350° F. to about 400° F. for about 30 seconds in a jet zone oven to obtain three-dimensional elephant shaped snacks which are baked or cooked substantially uniformly in their body portions as well as in their extremity portions.

What is claimed is:

1. Apparatus for the production of three-dimensional food products comprising:
    a. means for feeding a food composition to a plurality of dies,
    b. a plurality of dies for receiving said food composition and shaping it into at least one shape conforming to the orifices of the dies, whereby a shaped extrudate rope is obtained from each die,
    c. a plurality of first blades which pass across only a portion of each of the orifices of a plurality of said dies to only partially cut each of a plurality of the shaped extrudate ropes, and
    d. a plurality of second blades which pass across the entire orifices of a plurality of said dies to completely cut each of a plurality of the shaped partially cut extrudate ropes to obtain three-dimensional food pieces, said first blades and said second blades being arranged in alternating positions.

2. Apparatus as claimed in claim 1 wherein said apparatus further includes heating means for baking the three-dimensional food pieces into baked farinaceous-based products.

3. Apparatus as claimed in claim 1 wherein said means for feeding comprises an extruder.

4. Apparatus as claimed in claim 1 wherein said dies are arranged in two rows.

5. Apparatus as claimed in claim 1 comprising a conveyor means for receiving the three-dimensional food pieces as they are cut from said extrudate ropes.

6. Apparatus as claimed in claim 2 wherein said heating means is a fluidized bed heater.

7. Apparatus as claimed in claim 1 wherein said first blades are adjustable to vary the portion of the orifices which the blades pass over.

8. Apparatus as claimed in claim 1 wherein said plurality of first blades and said plurality of second blades are arranged on a rotating shaft, and said plurality of dies are disposed around said shaft.

9. Apparatus as claimed in claim 8 wherein said apparatus further includes heating means for baking the three-dimensional food pieces into baked farinaceous-based products.

10. Apparatus as claimed in claim 1 wherein said means for feeding includes counter-rotating rolls for feeding the food composition to said dies.

11. Apparatus as claimed in claim 1 wherein said plurality of dies are disposed in a circle about a rotating shaft, and said plurality of short blades and said plurality of long blades are arranged on said shaft so that each short blade partially cuts the extrudate rope from each die and each long blade completely cuts the extrudate rope from each die.

12. Apparatus as claimed in claim 1 wherein said first and second blades are arranged on a rotating shaft, and said plurality of dies are disposed around said shaft, the die orifices and the cutting edges of the first and second blades being spaced circumferentially so that the thickness of the cut pieces is substantially the same on opposing sides of the partially cut portion.

13. Apparatus; as claimed in claim 11 wherein the number of short blades and the number of long blades are each equal to the number of dies.

14. Apparatus as claimed in claim 11 wherein the number of short blades and the number of long blades are each less than one per die.

15. Apparatus as claimed in claim 11 wherein the ratio of short blades to dies is 1:1 to 3:1 and the ratio of long blades to dies is 1:1 to 3:1.

* * * * *